(12) United States Patent
Yamashita et al.

(10) Patent No.: US 11,171,339 B2
(45) Date of Patent: Nov. 9, 2021

(54) CARBON FOAM AND MEMBRANE ELECTRODE ASSEMBLY

(71) Applicant: ASAHI KASEI KABUSHIKI KAISHA, Tokyo (JP)

(72) Inventors: Junya Yamashita, Tokyo (JP); Satomi Fukunaga, Tokyo (JP); Atsushi Suzuki, Tokyo (JP); Shozo Takada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/463,999

(22) PCT Filed: Nov. 1, 2017

(86) PCT No.: PCT/JP2017/039593
§ 371 (c)(1),
(2) Date: May 24, 2019

(87) PCT Pub. No.: WO2018/096895
PCT Pub. Date: May 31, 2018

(65) Prior Publication Data
US 2020/0161670 A1    May 21, 2020

(30) Foreign Application Priority Data

Nov. 24, 2016  (JP) ............................. JP2016-228110
Nov. 24, 2016  (JP) ............................. JP2016-228114

(51) Int. Cl.
*H01M 8/0234*    (2016.01)
*H01M 8/1004*    (2016.01)
(Continued)

(52) U.S. Cl.
CPC .......... *H01M 8/0234* (2013.01); *C01B 32/05* (2017.08); *H01M 4/96* (2013.01); *H01M 8/1004* (2013.01);
(Continued)

(58) Field of Classification Search
CPC .................... H01M 8/1004; H01M 2004/021
See application file for complete search history.

(56) References Cited

U.S. PATENT DOCUMENTS 5,672,439 A * 9/1997 Wilkinson .......... H01M 8/1009
                                                           429/479
6,077,464 A    6/2000 Neil et al.
(Continued)

FOREIGN PATENT DOCUMENTS

CN    1247523 A    3/2000
CN    1681748 A    10/2005
(Continued)

OTHER PUBLICATIONS

Jan. 23, 2020, the Supplementary European Search Report issued by the European Patent Office in the corresponding European Patent Application No. 17874392.8.
(Continued)

*Primary Examiner* — Ula C Ruddock
*Assistant Examiner* — Thomas H. Parsons
(74) *Attorney, Agent, or Firm* — Kenja IP Law PC

(57) ABSTRACT

Provided is a carbon foam and a membrane electrode assembly having linear portions and node portions joining the linear portions; and a carbon foam and a membrane electrode assembly having linear portions and node portions joining the linear portions, where the carbon content is 51 mass % or more, and the mean deviation of coefficient of friction by the Kawabata evaluation system method is 0.006 or less.

30 Claims, 7 Drawing Sheets

(51) Int. Cl.
  *H01M 8/18* (2006.01)
  *H01M 4/96* (2006.01)
  *C01B 32/05* (2017.01)
  *H01M 4/02* (2006.01)

(52) U.S. Cl.
  CPC ...... *H01M 8/188* (2013.01); *H01M 2004/021* (2013.01)

(56) References Cited

U.S. PATENT DOCUMENTS

| | | |
|---|---|---|
| 2004/0067407 A1 | 4/2004 | Bhaskar et al. |
| 2006/0014908 A1 | 1/2006 | Udo et al. |
| 2014/0017595 A1 | 1/2014 | Kunju Krishna et al. |
| 2017/0244107 A1 | 8/2017 | Masamichi et al. |

FOREIGN PATENT DOCUMENTS

| | | |
|---|---|---|
| JP | H08120600 A | 5/1996 |
| JP | H09167621 A | 6/1997 |
| JP | 2000004739 A | 1/2000 |
| JP | 2001085028 A | 3/2001 |
| JP | 2002326871 A | 11/2002 |
| JP | 2004217446 A | 8/2004 |
| JP | 2006502548 A | 1/2006 |
| JP | 2006245253 A | 9/2006 |
| JP | 2007269505 A | 10/2007 |
| JP | 2010006628 | * 1/2010 |
| JP | 2010006628 A | 1/2010 |
| JP | 2014514697 A | 6/2014 |
| WO | 2016060045 A1 | 4/2016 |

OTHER PUBLICATIONS

Sep. 6, 2019, the partial supplementary European search report issued by the European Patent Office in the corresponding European Patent Application No. 17874392.8.

Jan. 16, 2018, International Search Report issued in the International Patent Application No. PCT/JP2017/039593.

May 28, 2019, International Preliminary Report on Patentability issued in the International Patent Application No. PCT/JP2017/039593.

* cited by examiner

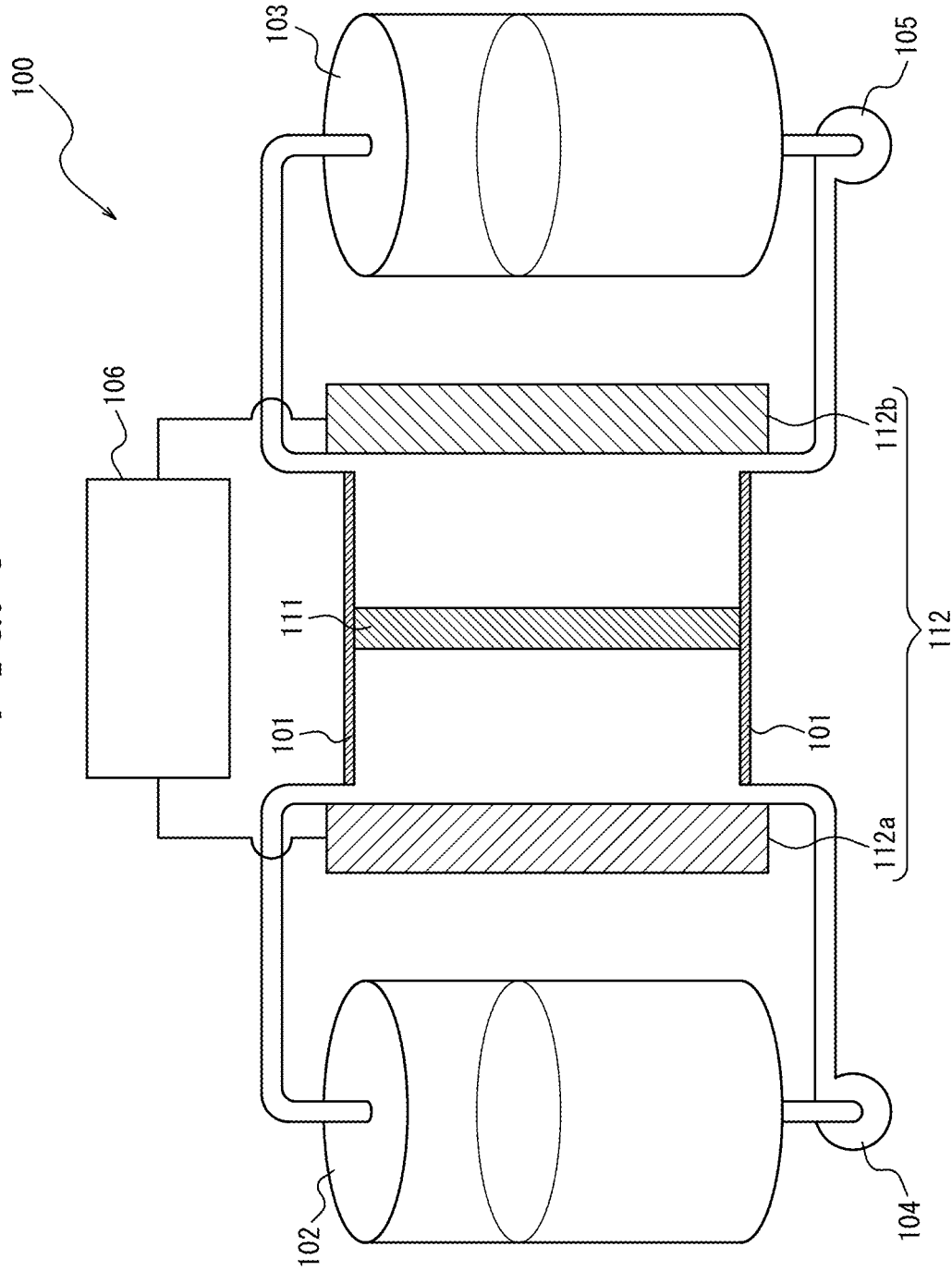

CARBON FOAM AND MEMBRANE ELECTRODE ASSEMBLY

TECHNICAL FIELD

This disclosure relates to a carbon foam and a membrane electrode assembly including an electrolyte membrane and a carbon electrode.

BACKGROUND

In recent years, the introduction of power generation using renewable energy such as solar light and wind power has been promoted as a measure against global warming. The output of such power generation is greatly affected by the weather, rendering the voltage and frequency of the system power supply unstable. Therefore, when introducing large-scale power generation, it is necessary to smooth the output and level the load by combining with a large-capacity storage battery.

Carbon foam is a material obtained, for example, by subjecting melamine resin foam (foam) to heat treatment in an inert gas atmosphere for carbonization, and it is used for various applications because of its porosity, flexibility and electrical properties. The carbon foam is significantly different from common carbon fiber nonwoven fabric in the following aspects: the carbon foam has a narrow fiber diameter, so that its microstructure is finer and its specific surface area is large; and the carbon foam has an integral structure in which all the fibers are connected.

For example, JP 2002-326871 A (PTL 1) describes using carbon foam as a filter which is used under special conditions such as high temperatures or drug uses. In addition, JP 2004-217446 A (JPL 2) describes using carbon foam as a heat insulating material having high heat insulating properties even at high temperatures. Furthermore, JP H09-167621 A (PTL 3) and JP 2007-269505 A (PTL 4) describe using carbon foam as an electrode having high electrical activity and conductivity.

Examples of applications of a carbon electrode include lead storage batteries, sodium-sulfur batteries, metal-halogen batteries, and redox flow batteries. In order to smooth the output and level the load, which is the problem of the power generation using renewable energy such as solar light and wind power that has been recently introduced as a measure against global warming, it is necessary to introduce large-scale power generation in combination with these large-capacity storage batteries.

Among the above-mentioned large-capacity storage batteries, the redox flow battery is superior to other batteries in terms of reliability and economy, and is one of the batteries most likely to be put to practical use.

FIG. 6 is a schematic view of a common structure of a redox flow battery. As illustrated in this figure, a redox flow battery 100 includes an electrolytic bath 101, tanks 102 and 103 for storing an electrolytic solution, and pumps 104 and 105 for circulating the electrolytic solution between the tanks and the electrolytic bath. The electrolytic bath 101 has electrodes 112 composed of a positive electrode 112a and a negative electrode 112b which are separated by an electrolyte membrane 111. In addition, the electrolytic bath 101 is connected to a power source 106.

In the redox flow battery 100, charge and discharge are performed by converting electrochemical energy on the electrodes 112 of the electrolytic bath 101 while circulating the electrolytic solution between the tanks 102 and 103 and the electrolytic bath 101 by the pumps 104 and 105.

In the redox flow battery 100 illustrated in FIG. 6, the electrolyte membrane 111 and the electrodes 112 are separated. In order to increase the current density per unit area of an electrode, a battery is often obtained by, as illustrated in FIG. 7A, joining an electrolyte membrane 11 and electrodes 12 to form a membrane electrode assembly 10, sandwiching the membrane electrode assembly 10 between current collectors 14 via a separator 13 to form a cell 20 as illustrated in FIG. 7B, and providing a plurality of such cells 20 to constitute a battery.

The cell 20 illustrated in FIG. 7B usually uses a carbon fiber aggregate as the electrode 12 because it is necessary to secure conductivity, electrochemical stability and electrolytic solution flowability. For example, JP 2014-514697 A (PTL 5) describes using carbon fiber paper as an electrode material, and JP 2001-085028 A (PTL 6) describes using carbon fiber nonwoven fabric as an electrode material.

CITATION LIST

Patent Literature

PTL 1: JP 2002-326871 A
PTL 2: JP 2004-217446 A
PTL 3: JP H09-167621 A
PTL 4: JP 2007-269505 A
PTL 5: JP 2014-514697 A
PTL 6: JP 2001-085028 A

SUMMARY

Technical Problem

<Technical problem to be Solved by the First Embodiment of the Present Disclosure>

In a case where carbon foam is used as, for example, a filter, a heat insulating material or an electrode as described above, a compressive load may be applied to the carbon foam. For example, when carbon foam is used as a heat insulating material, the carbon foam may be used in a compressed state in order to enhance the heat insulating performance.

In addition, when carbon foam is used as an electrode of a rechargeable battery, it is common to dispose the carbon foam on both sides of an electrolyte membrane and dispose current collectors on the surfaces of the carbon foam, in order to increase the current density per unit area of the electrode. In this case, the carbon foam is strongly sandwiched by the current collectors so that the electrical contact between the current collectors and the carbon foam is secured.

However, when a conventional carbon foam is used in a compressed state, the performance of the carbon foam and the performance of the system using the carbon foam may decrease.

<Technical Problem to be Solved by the Second Embodiment of the Present Disclosure>

In a case where carbon foam is used for a storage battery and charge and discharge are repeated in a redox flow battery configured by a plurality of cells 20 as described above, the electrolyte membrane 11 may peel from the electrode 12 in the membrane electrode assembly 10 and the battery performance may decrease significantly.

The peeling of electrolyte membrane may also occur in other applications. That is, the membrane electrode assembly as described above is used not only in a redox flow battery but also in various applications such as a water electrolysis device with a solid polymer membrane, and a direct methanol fuel battery. When electrolysis, charge and discharge, and the like are repeatedly performed in these applications, the electrolyte membrane may peel from the electrode and the performance may decrease.

Thus, the first embodiment of the present disclosure aims to provide a carbon foam in which carbon fiber breakage is suppressed and powdering off is reduced when a compressive load is applied thereon. In addition, the second embodiment of the present disclosure aims to provide a membrane electrode assembly in which the peeling of electrolyte membrane from electrode caused by the repetition of electrolysis, charge and discharge, and the like is suppressed and the decrease in performance is suppressed.

Solution to Problem

<Solution to the First Problem>

As a result of keen examination, we discovered that when a compressive load is applied to a conventional carbon foam, carbon fibers may break and fall and so-called powdering off may occur in a large amount, which may decrease the performance of the carbon foam itself. In addition, we discovered that when a conventional carbon foam is incorporated into a device such as a redox flow battery, the performance of the device may be decreased because of occurrence of powdering off and electrode damage.

Specifically, the present disclosure provides the following.

[1] A carbon foam comprising linear portions and node portions joining the linear portions, wherein
the carbon foam has a carbon content of 51 mass % or more, and
when the carbon foam is applied with a compressive load of 1.25 MPa and left standing for one minute, powdering off is 10 mass % or less.

[2] A carbon foam comprising linear portions and node portions joining the linear portions, wherein
the carbon foam has a carbon content of 51 mass % or more, and
at least a part of the carbon foam has a density of the node portions of 30,000/mm$^3$ or more.

[3] A carbon foam comprising linear portions and node portions joining the linear portions, wherein
in at least a part of the carbon foam, a thickness direction of the carbon foam is defined as x direction, a direction perpendicular to the x direction is defined as y direction, and a direction perpendicular to the x direction and the y direction is defined as z direction, and
for the linear portions in a region of 300 μm×300 μm×300 μm,
an average value of orientation angle with respect to the x direction is defined as $\theta_{avex}$,
an average value of orientation angle with respect to the y direction is defined as $\theta_{avey}$, and
an average value of orientation angle with respect to the z direction is defined as $\theta_{avez}$, then
a difference $\theta_c$ between the maximum value and the minimum value of the $\theta_{avex}$, the $\theta_{avey}$ and the $\theta_{avez}$ is 3° or more.

[4] The carbon foam according to any one of [1] to [3], having a tinting strength of 5% or more and 60% or less.

[5] The carbon foam according to any one of [1] to [4], wherein a ratio of the number of the linear portions to the number of the node portions is 1.2 or more and 1.7 or less.

[6] The carbon foam according to [5], wherein the ratio of the number of the linear portions to the number of the node portions is 1.4 or more and 1.5 or less.

[7] The carbon foam according to any one of [1] to [6], wherein an average diameter of fibrous carbon of the linear portions is 5 μm or less.

[8] The carbon foam according to any one of [1] to [7], wherein a crystallite size determined from diffraction of (002) plane in powder X-ray diffraction measurement is 1.50 nm or more.

[9] The carbon foam according to any one of [1] to [8], wherein the carbon foam recovers to 80% or more of an initial membrane thickness within 60 seconds after release from a load which compresses the carbon foam to 40% of the initial membrane thickness in a uniaxial compression test.

[10] The carbon foam according to any one of [1] to [9], wherein a mean deviation of coefficient of friction by the Kawabata evaluation system method is 0.006 or less.

[11] The carbon foam according to any one of [1] to [10], wherein a specific surface area determined from a real density of the carbon foam and the average diameter of fibrous carbon of the linear portions is 0.5 m$^2$/g or more.

[12] A membrane electrode assembly comprising an electrolyte membrane and the carbon electrode made of the carbon foam according to any one of [1] to [11] on one side or both sides of the electrolyte membrane.

<Solution to the Second Problem>

In addition, we made keen examination on the membrane electrode assembly, and investigated the cause of the peeling of electrolyte membrane 11 in detail. The electrolyte membrane 11 swells and contracts as the electrolytic solution goes in and out during charge and discharge. The swelling and contraction is suppressed by sandwiching the electrodes 12 joined to both surfaces of the electrolyte membrane 11 between the current collectors 14. However, in a case where the joining strength or the sandwiching pressure is insufficient with respect to the degree of the swelling and contraction, local peeling caused by charge and discharge progresses with the repetition of charge and discharge, and finally the entire interface peels off. In order to increase the joining strength, it is generally effective to increase the surface roughness of the electrode 12 to enhance the anchor effect. However, on the other hand, this increases the risk of shorting the electrodes 12. Increasing the sandwiching pressure on the electrodes 12 also increases the risk of shorting.

We thus made keen examination on the method of increasing the joining strength between the electrolyte membrane 11 and the electrodes 12 without shorting the electrodes 12, and discovered that it is extremely effective to constitute the electrodes 12 of the membrane electrode assembly 10 with carbon foam (foam) and to set the mean deviation of the coefficient of friction of the electrodes 12 according to the Kawabata evaluation system (hereinafter, also referred to as "KES") method to 0.006 or less, thereby completing the present disclosure.

Specifically, the present disclosure provides the following.

[13] A carbon foam comprising linear portions and node portions joining the linear portions, wherein the carbon foam has a carbon content of 51 mass % or more, and a mean deviation of coefficient of friction by the Kawabata evaluation system method is 0.006 or less.

[14] A membrane electrode assembly comprising an electrolyte membrane and a carbon electrode made of the carbon foam according to [13] on one side or both sides of the electrolyte membrane.

[15] The membrane electrode assembly according to [14], wherein a ratio of the number of the linear portions to the number of the node portions is 1.2 or more and 1.7 or less.

[16] The membrane electrode assembly according to [15], wherein a ratio of the number of the linear portions to the number of the node portions is 1.4 or more and 1.5 or less.

[17] The membrane electrode assembly according to any one of [14] to [16], wherein an average diameter of fibrous carbon of the linear portions is 5 µm or less.

[18] The membrane electrode assembly according to any one of [14] to [17], having a tinting strength of 5% or more and 60% or less.

[19] The membrane electrode assembly according to any one of [14] to [18], wherein a crystallite size obtained from diffraction of (002) plane in powder X-ray diffraction measurement is 1.50 nm or more.

[20] The membrane electrode assembly according to any one of [14] to [19], wherein the membrane electrode assembly recovers to 80% or more of an initial membrane thickness within 60 seconds after release from a load which compresses the membrane electrode assembly to 40% of the initial membrane thickness in a uniaxial compression test.

[21] The membrane electrode assembly according to any one of [14] to [20], wherein a specific surface area determined from a real density of the carbon foam and the average diameter of fibrous carbon of the linear portions is 0.5 m$^2$/g or more.

Advantageous Effect

<Effect of the First Embodiment>

According to the present disclosure, it is possible to provide a carbon foam in which carbon fiber breakage is suppressed and powdering off is reduced when a compressive stress is applied thereon.

<Effect of the Second Embodiment>

According to the present disclosure, it is possible to suppress the peeling of electrolyte membrane from electrode caused by the repetition of electrolysis, charge and discharge, and the like.

BRIEF DESCRIPTION OF THE DRAWINGS

In the accompanying drawings:

FIG. 1A is a cross section image and FIG. 1B is a surface image;

FIG. 6 is a schematic view of a common configuration of a redox flow battery;

DETAILED DESCRIPTION

Figure 1A:
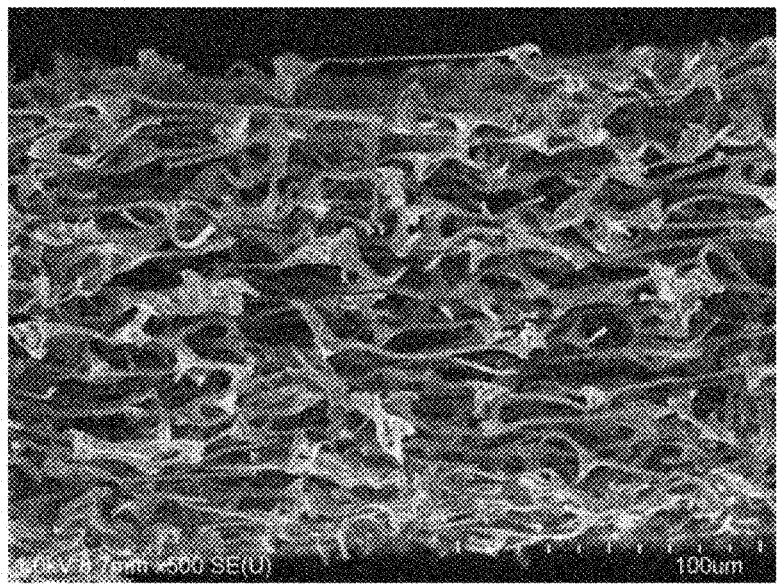
FIGS. 1A and 1B are SEM images of the carbon foam of Example 1, where

The following provides a detailed description of an embodiment of the present disclosure (hereinafter, referred to as the "present embodiment"), but this disclosure is not limited by the following description and may be implemented with various alterations within the essential scope thereof.

First Embodiment

The carbon foam of the present embodiment is a carbon foam having linear portions (lines) and node portions (nodes) joining the linear portions, and has a three-dimensional network structure.

In order to establish a method for suppressing carbon fiber breakage and reducing powdering off when a compressive load is applied to a carbon foam, we investigated the mechanism of occurrence of carbon fiber breakage upon application of a compressive load.

A common carbon foam has a structure in which the linear portions of the carbon fibers constituting the carbon foam are isotropically oriented with respect to three mutually orthogonal directions. We supposed that the linear portion which breaks when a compressive load is applied to the carbon foam may be oriented substantially parallel to the application direction of the compressive load.

In other words, we considered that, when a force is applied to a linear portion of a carbon fiber in a direction perpendicular to the orientation direction of the linear portion, the linear portion deforms (bends) to absorb the applied force. On the other hand, we considered that, when a force is applied to a linear portion in the orientation direction of the linear portion, the linear portion hardly contracts, so it breaks without being able to absorb the applied force.

Based on the above supposition, we conducted intensive studies on a method for distributing the load as uniformly as possible during compression. As a result, we discovered that this problem can be solved by increasing the node portion density in the carbon foam.

For the carbon foam of the present embodiment, the node portion density is preferably 30,000/mm$^3$ or more, more preferably 50,000/mm$^3$ or more, and further preferably 100,000/mm$^3$ or more. From the viewpoint of securing a space for the deformation of linear portions and node portions during compression, the node portion density is preferably 5,000,000/mm$^3$ or less, more preferably 3,000,000/mm$^3$ or less, and further preferably 2,000,000/mm$^3$ or less.

It is acceptable that at least a part of the carbon foam of the present embodiment has a location where the node portion density satisfies the above ranges. It is preferable that 50 volume % of the carbon foam satisfies the above density ranges, more preferable that 75 volume % of the carbon foam satisfies the above density ranges, and particularly preferable that any location in the carbon foam satisfies the above density ranges.

Based on the above supposition, we also conducted intensive studies on a method for, when a compressive load is applied to a carbon foam, avoiding applying the load to the linear portions of the carbon fibers constituting the carbon foam in their orientation directions. As a result, we conceived the idea of giving anisotropy to the orientation of the carbon fibers (linear portions).

Accordingly, we discovered that when the average value of orientation angle of the linear portions with respect to each of the three mutually orthogonal directions satisfies a condition where the difference between the average value of the orientation angle with respect to one direction and at least one of the average values of the orientation angle with respect to the other directions is no less than a predetermined value, the carbon fiber breakage can be suppressed. Furthermore, we discovered that it is possible to maintain the high resilience of the carbon foam even if carbonization is performed at a higher temperature.

<Ratio R of the Number $N_1$ of Linear Portions to the Number $N_n$ of Node Portions>

For the carbon foam of the present embodiment, the ratio R of the number $N_1$ of the linear portions to the number $N_n$ of the node portions is preferably 1.2 or more, more preferably 1.3 or more, and particularly preferably 1.4 or more. In addition, it is preferably 1.7 or less or 1.6 or less, and particularly preferably 1.5 or less.

The ratio R is, in other words, the average number of branches branching at a node portion. In a case of a structure where unjoined linear portions are in contact such as nonwoven fabric, the value of ratio R is small. On the other hand, in a case of a porous structure covered with, for example, a honeycomb-like wall surface where the linear portions are in a belt shape, the value of ratio R is large.

In addition, from the viewpoints of the robustness of the three-dimensional structure and the maintaining of flexibility against pressing, it is preferably 1.42 or more and 1.48 or less, and more preferably 1.44 or more and 1.46 or less.

<Orientation Angle of Linear Portion>

For the carbon foam of the present embodiment, the average value of the orientation angle of the linear portions with respect to each of the three mutually orthogonal directions satisfies a condition where the difference θ between the average value of the orientation angle with respect to one direction and at least one of the average values of the orientation angle with respect to the other directions is 3° or more. In this way, it is possible to suppress the breakage of carbon fibers (linear portions) and reduce powdering off even when a compressive load is applied to the carbon foam. The difference θ is preferably 5° or more, more preferably 8° or more, and particularly preferably 10° or more. In addition, from the viewpoint of the flexibility of the carbon foam, the difference θ is preferably 35° or less, more preferably 25° or less, further preferably 20° or less, and particularly preferably 15° or less. On the contrary, when the difference θ is less than 3°, isotropic orientation increases, and there is a possibility that the carbon fibers will break and fall or, in other words, a considerable amount of powdering off will occur upon application of a compressive load.

For the three directions, the thickness direction of the carbon foam is defined as x direction, the direction perpendicular to the x direction is defined as y direction, and the direction perpendicular to the x direction and the y direction is defined as z direction.

For the linear portions in a region of 300 μm×300 μm×300 μm in the carbon foam, the average value of orientation angle of the linear portions with respect to the x direction is defined as $\theta_{avex}$, the average value of orientation angle with respect to the y direction is defined as $\theta_{avey}$, and the average value of orientation angle with respect to the z direction is defined as $\theta_{avez}$. In this case, the carbon foam preferably includes a region where the difference $\theta_c$ between the maximum value and the minimum value of $\theta_{avex}$, $\theta_{avey}$ and $\theta_{avez}$ is 3° or more. The difference $\theta_c$ between the maximum value and the minimum value of $\theta_{avex}$, $\theta_{avey}$ and $\theta_{avez}$ is more preferably 5° or more, further preferably 8° or more, and particularly preferably 10° or more. The upper limit of the difference $\theta_c$ between the maximum value and the minimum value of $\theta_{avex}$, $\theta_{avey}$ and $\theta_{avez}$ is not particularly limited, but it is preferably 35° or less, more preferably 25° or less, further preferably 20° or less, and particularly preferably 15° or less, from the viewpoint of the flexibility of the carbon foam.

In addition, the differences between the maximum value of $\theta_{avex}$, $\theta_{avey}$ and $\theta_{avez}$ and the remaining two are preferably both 3° or more, more preferably 5° or more, further preferably 8° or more, and particularly preferably 10° or more. The upper limit of the differences between the maximum value of $\theta_{avex}$, $\theta_{avey}$ and $\theta_{avez}$ and the remaining two is not particularly limited, but it is preferably 35° or less, more preferably 25° or less, and further preferably 20° or less, from the viewpoint of the flexibility of the carbon foam. In other words, it is preferable that the difference $\theta_d$ between the maximum value and the second maximum value of $\theta_{avex}$, $\theta_{avey}$ and $\theta_{avez}$ satisfies the above ranges.

It is acceptable that at least a part of the carbon foam of the present embodiment includes a region of length 300 μm×width 300 μm×height 300 μm which satisfies the above provisions of $\theta_{avex}$, $\theta_{avey}$ and $\theta_{avez}$. It is preferable that 50 volume % of the carbon foam satisfies the above angle provisions, more preferable that 75 volume % of the carbon foam satisfies the above density ranges, and particularly preferable that any location in the carbon foam satisfies the above angle provisions.

Figure 3:
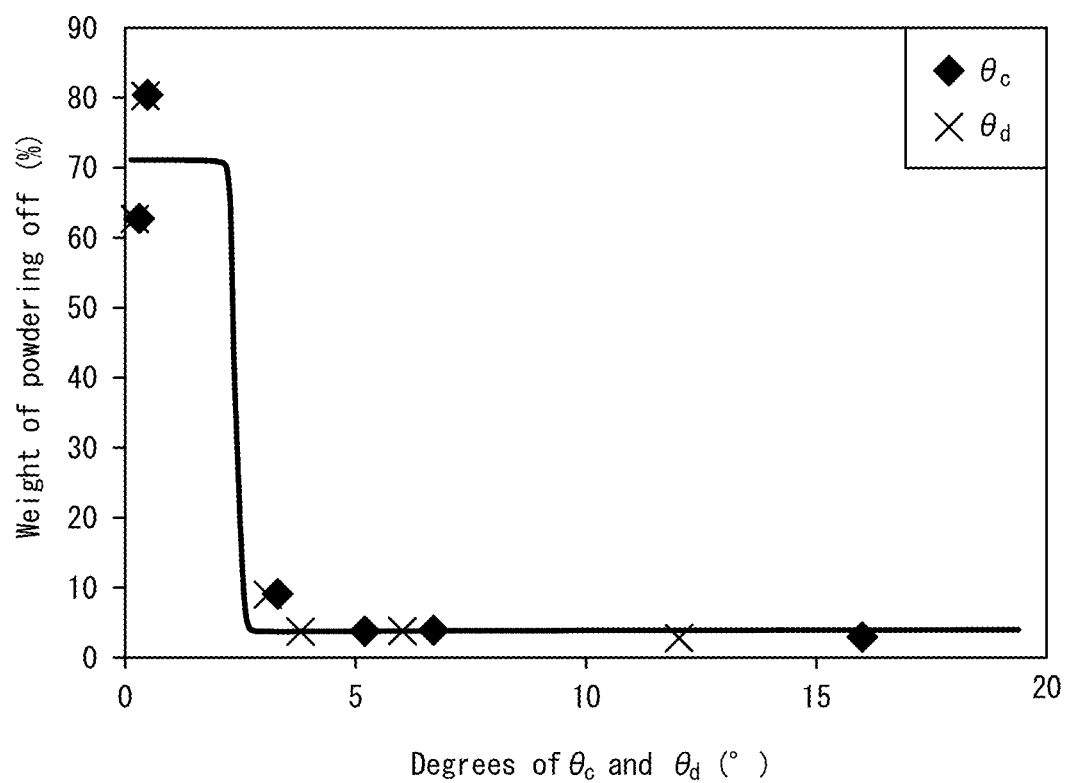
FIG. 3 is a graph illustrating the relationship between the differences $\theta_c$ and $\theta_d$, which are indicators indicating the anisotropy of orientation, and the weight of powdering off.

As described above, there is a relationship between orientation and powdering off, and FIG. 3 illustrates the relationship between the difference θ, which is an indicator indicating the anisotropy of orientation, and the weight of the powdering off.

In the present specification, the number $N_n$ of the node portions, the number $N_1$ of the linear portions, and the orientation angle θ (including $\theta_c$ and $\theta_d$) are obtained by imaging the carbon foam using an X-ray computerized tomography (CT) apparatus, subjecting the obtained tomogram data to median filter treatment as preprocessing, then using OTSU's binarization algorithm (see Nobuyuki OTSU, "Automatic Threshold Selection Method based on Discrimination and Least Squares Criterion", The IEICE Transactions D, Vol. J63-D, No. 4, pp. 346-356 (1980)) to divide the region into structure and space to obtain a three-dimensional image of a structure including the inside of the carbon foam, and using the obtained three-dimensional image and structural analysis software to determine the values.

Specifically, the number $N_n$ of the node portions and the number $N_1$ of the linear portions are determined by detecting the node portions and the linear portions included in the three-dimensional image obtained as described above, and counting the numbers thereof. With the $N_n$ and $N_1$ thus obtained, the ratio R of $N_1$ to $N_n$ can be determined.

<Ratio R of the number $N_1$ of linear portions to the number $N_n$ of node portions>

For the carbon foam of the present embodiment, the ratio R of the number $N_1$ of the linear portions to the number $N_n$ of the node portions is preferably 1.2 or more, more preferably 1.3 or more, and particularly preferably 1.4 or more. In addition, it is preferably 1.7 or less or 1.6 or less, and particularly preferably 1.5 or less.

The ratio R is, in other words, the average number of branches branching at a node portion. In case of a structure where unjoined linear portions are in contact such as nonwoven fabric, the value of ratio R is small. On the other hand, in a case of a porous structure covered with, for example, a honeycomb-like wall surface where the linear portions are in a belt shape, the value of ratio R is large.

In addition, from the viewpoints of the robustness of the three-dimensional structure and the maintaining of flexibility against pressing, it is preferably 1.42 or more and 1.48 or less, and more preferably 1.44 or more and 1.46 or less.

The orientation angle θ of a linear portion is an angle between a straight line connecting the node portions at two ends of the linear portion and each direction, and is determined for each of the three mutually orthogonal directions in the three-dimensional image. The average value of orientation angle of the linear portions is determined for each direction.

A CT apparatus with low-energy and high-brightness X-rays such as a high-resolution 3D X-ray microscope nano3DX manufactured by Rigaku Corporation may be used as the CT apparatus for carbon foam structural analysis. For the image processing and structural analysis, Centerline Editor of Simpleware software manufactured by JSOL Corporation, for example, may be used.

The number $N_n$ of the node portions, the number $N_1$ of the linear portions, and the orientation angle $\theta$ are measured with the measurement methods described in the EXAMPLES section.

<Powdering Off>

When powdering off occurs in the carbon foam of the present embodiment, there is a possibility that the fragments of the powdered carbon foam adhere to other members and inhibit the performance of the other members. In addition, the conductivity and resilience of the carbon foam decrease. Therefore, it is important that the amount of powdering off be 10 mass % or less, preferably less than 5 mass %, and more preferably less than 2 mass %. The lower limit is not particularly limited, but it may be 0.01 mass % or more, 0.05 mass % or more, 0.1 mass % or more, or 0.5 mass % or more. The amount of powdering off is measured with the method described in the EXAMPLES section.

<Carbon Content>

From the viewpoint of conductivity, the carbon content of the carbon foam of the present embodiment is preferably 51 mass % or more, 60 mass % or more, 65 mass % or more, 70 mass % or more, 75 mass % or more, or 80 mass % or more, more preferably 85 mass % or more, and further preferably 90 mass % or more. The upper limit is not particularly limited, but it may be 100 mass % or less, 99 mass % or less, or 98 mass % or less.

The carbon content of the carbon foam can be determined by X-ray fluorescence measurement, and specifically, it is measured with the method described in the EXAMPLES section.

<Tinting Strength>

The tinting strength of the carbon foam of the present embodiment is preferably 5% or more, more preferably 10% or more, and further preferably 15% or more, from the viewpoint of the ease of detection of carbon foam mixed in an electrolyte solution due to powdering off in a case where, for example, the carbon foam is used in a redox flow battery. The upper limit is not particularly limited, but it may be 60% or less, 50% or less, or 40% or less. The tinting strength is measured with the method described in the EXAMPLES section.

<Porosity>

The porosity of the anisotropic carbon foam of the present embodiment is preferably 50% or more, and more preferably 60% or more, 70% or more, 80% or more, or 90% or more, from the viewpoint of flexibility. The upper limit of the porosity is not particularly limited, but it may be less than 100%, 99% or less, 98% or less, 95% or less, or 90% or less.

In the present specification, the porosity is a value determined from bulk density and real density. Bulk density is a density based on the volume including the pores in the carbon foam. On the other hand, real density is a density based on the volume occupied by the material of the carbon foam.

[Measurement of Bulk Density]

First, the dimensions of the carbon foam are measured using vernier calipers or the like, and the obtained dimensions are used to determine the bulk volume $V_{bulk}$ of the carbon foam. Next, the mass M of the carbon foam is measured using a precision balance. With the obtained mass M and bulk volume $V_{bulk}$, the bulk density $\rho_{bulk}$ of the carbon foam can be determined using the following equation (1).

$$\rho_{bulk} = M/V_{bulk} \tag{1}$$

[Measurement of Real Density]

The real density $\rho_{real}$ of the carbon foam can be determined with the sink-float method using a mixed solution of n-heptane, carbon tetrachloride and ethylene dibromide. Specifically, carbon foam of an appropriate size is inserted into a stoppered test tube first. Next, three solvents are appropriately mixed and added to the test tube, and the test tube is soaked in a thermostat bath at 30° C. If the specimen comes up, then low-density n-heptane is added. On the other hand, if the specimen sinks down, then high-density ethylene dibromide is added. This operation is repeated until the specimen floats in the liquid. Finally, the density of the liquid is measured using a Gay-Lussac pycnometer.

[Calculation of Porosity]

With the bulk density $\sigma_{bulk}$ and the real density $\rho_{real}$ determined as described above, the porosity $V_{f,pore}$ can be determined using the following equation (2).

$$V_{f,pore} = ((1/\rho_{bulk}) - (1/\rho_{real}))/(1/\rho_{bulk}) \times 100 (\%) \tag{2}$$

<Crystallite Size>

The crystallite size Lc of the carbon foam of the present embodiment is preferably 1.1 nm or more and more preferably 1.5 nm or more from the viewpoint of conductivity. In addition, it is preferably 4.0 nm or less and more preferably 3.0 nm or less, from the viewpoint of physical fragility. The crystallite size Lc is measured with the method described in the EXAMPLES section.

<Average Diameter>

The average diameter $d_{ave}$ of the fibrous carbon constituting a carbon electrode 3, which is measured by scanning electron microscope observation, is preferably 10 μm or less, more preferably 5 μm or less, and further preferably 3 μm or less. In this way, the peeling resistance between an electrolyte membrane 2 and the carbon electrode 3 can be improved as the specific surface area increases. The lower limit of the average diameter $d_{ave}$ of the fibrous carbon is not particularly limited, but it may be 0.1 μm or more, 0.5 μm or more, or 1 μm or more.

[Method of Measuring Average Diameter]

The average diameter $d_{ave}$ of the fibrous carbon constituting the carbon electrode 3 is determined by image analysis of a scanning electron microscope image. Specifically, the carbon electrode 3 is observed at a magnification of 10,000 using a scanning electron microscope. Twenty locations are randomly selected on the obtained observation image, and the thickness of the fibrous carbon at these locations is measured. Assuming that the cross section is in a circular shape, the average thickness is taken as the average diameter $d_{ave}$.

<Specific Surface Area>

The specific surface area S of the carbon electrode 3, which is determined from the real density of the carbon electrode and the average diameter of the fibrous carbon constituting the carbon electrode, is preferably 0.5 m²/g or more and more preferably 1 m²/g or more. In this way, it is possible to sufficiently secure the joining area to the electrolyte membrane 2, thereby improving the peeling resistance. The upper limit of the specific surface area S is not particularly limited, but it may be 100 m²/g or less, 50 m²/g or less, 30 m²/g or less, 15 m²/g or less, or 10 m²/g or less.

[Calculation of Specific Surface Area]

Assuming that the shape of the fibrous carbon constituting the carbon electrode 3 is cylindrical, the specific surface area S of the carbon electrode 3 can be determined from the real density $\rho_{real}$ and the average diameter $d_{ave}$ determined as described above using the following (13).

$$S=4/(\rho_{real} \times d_{ave}) \quad (13)$$

(Method of Preparing Carbon Foam)

The carbon foam of the present embodiment can be obtained by subjecting a resin foam as a material to heat treatment in an inert gas flow such as nitrogen or in an inert gas atmosphere such as vacuum for carbonization while applying a compressive load to the resin foam. In this case, it is important that the heat treatment temperature be higher than the softening point of the resin foam. In this way, the density of the node portions in the carbon foam is increased, and the carbon fibers constituting the carbon foam are oriented in a direction perpendicular to the application direction of the compressive load, so that the orientation of the carbon fibers is made to have anisotropy.

For example, when a melamine resin foam is used as the foam material, a melamine/formaldehyde condensation foam produced with the method described in JP H04-349178 A can be used as the melamine resin foam, for example.

According to the above method, an aqueous solution or dispersion containing a melamine/formaldehyde precondensate, an emulsifier, a volatile foaming agent, a curing agent, and, if necessary, a well-known filler is first subjected to foaming treatment and then curing treatment to obtain a melamine/formaldehyde condensation foam.

In the above method, the melamine/formaldehyde precondensate may be one having a ratio of melamine:formaldehyde=1:1.5 to 1:4, and an average molecular weight of 200 to 1000, for example. In addition, examples of the emulsifier include 0.5 mass % to 5 mass % (based on the melamine/formaldehyde precondensate, the same as below) of sodium salts of alkyl sulfonic acid and aryl sulfonic acid, examples of the volatile foaming agent include 1 mass % to 50 mass % of pentane and hexane, and examples of the curing agent include 0.01 mass % to 20 mass % of hydrochloric acid and sulfuric acid. In the foaming treatment and the curing treatment, the solution composed of the above components may be heated to a temperature set in accordance with the type of the used volatile foaming agent and the like.

The heat treatment temperature for the carbonization of the melamine resin foam is set no lower than the softening point (300° C. to 400° C.) of the melamine resin foam. The temperature is preferably 800° C. or higher and more preferably 1000° C. or higher. In addition, from the viewpoint of physical fragility caused by high crystallinity, the temperature is preferably 3000° C. or lower and more preferably 2500° C. or lower.

The compressive load applied to the carbon foam is preferably 50 Pa or more and more preferably 200 Pa or more from the viewpoint of providing anisotropy. In addition, it is preferably 2000 Pa or less and more preferably 1500 Pa or less from the viewpoint of maintaining the three-dimensional structure.

When the compressing is performed using a vacuum press apparatus or the like, it is necessary to determine the membrane thickness after pressing with a spacer and control the compression rate obtained by dividing the original thickness by the thickness of the spacer. In this case, the compression rate is preferably 4 times or more and more preferably 10 times or more from the viewpoint of providing anisotropy. In addition, it is preferably 100 times or less and more preferably 50 times or less from the viewpoint of maintaining the three-dimensional structure The compressive stress on the resin foam may be applied not only in one direction but also in two directions.

The anisotropic carbon foam of the first embodiment can be suitably used for a membrane electrode assembly, an electrode of a redox flow battery, an electrode of a fuel cell, a gas diffusion layer and other applications.

Second Embodiment (Membrane Electrode Assembly)

Figure 8:
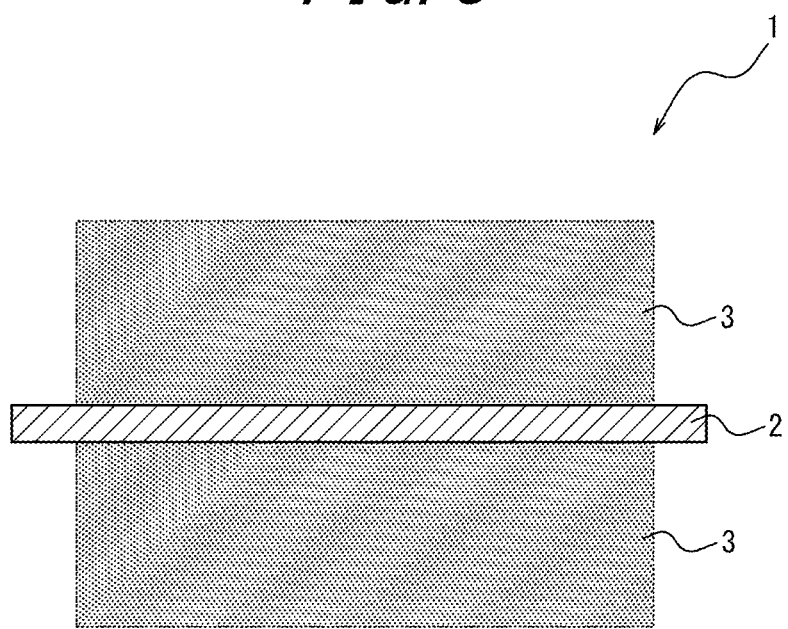
FIG. 8 illustrates a membrane electrode assembly of the present disclosure.

FIG. 8 illustrates a membrane electrode assembly of the present disclosure. The membrane electrode assembly 1 illustrated in the figure includes an electrolyte membrane 2 and carbon electrodes 3 disposed on both sides of the electrolyte membrane. The carbon electrode 3 here is characterized in that it is made of carbon foam, and that the mean deviation (hereinafter, also referred to as "MMD") of the coefficient of friction of the carbon electrode 3 according to the Kawabata evaluation system method (KES method) is 0.006 or less.

Electrolyte Membrane

The electrolyte membrane 2 of the present embodiment is a polymer electrolyte membrane. The type of the polymer electrolyte membrane is not particularly limited. However, it is preferably a membrane having proton conductivity from the viewpoint of the use in a redox flow battery.

Examples of the membrane having proton conductivity include porous membranes such as a PTFE (polytetrafluoroethylene resin) porous membrane, a polyolefin-based porous membrane, and a polyolefin-based nonwoven fabric described in JP 2005-158383 A; a composite membrane obtained by combining porous membrane and hydrous polymer described in JP H06-105615 B; a membrane of cellulose or ethylene-vinyl alcohol copolymer described in JP S62-226580 B; a polysulfone-based anion exchange membrane described in JP H06-188005 A; a fluorine-based or polysulfone-based ion exchange membrane described in JP H05-242905 A; a membrane where a hydrophilic resin is provided in the pores of a porous membrane formed of polypropylene or the like described in JP H06-260183 A; a membrane where several μm of fluorine-based ion exchange resin (Nafion® (Nafion is a registered trademark in Japan, other countries, or both)) is thinly coated on both surfaces of a polypropylene porous membrane; a membrane made of cross-linked polymer obtained by copolymerizing anion exchange type having pyridinium group and styrene type and divinylbenzene described in JP H10-208767 A; a membrane having a structure where a cationic ion exchange membrane (fluorine-based polymer or hydrocarbon-based polymer) and an anionic ion exchange membrane (polysulfone-based polymer or the like) are alternately laminated described in JP H11-260390 A; and an anion exchange membrane composed of a cross-linked polymer derived from a repeating unit of a vinyl heterocyclic compound with two or more hydrophilic groups (amine group-containing vinyl pyrolidone or the like) and a porous substrate described in JP 2000-235849 A. Among these, a membrane made of perfluorosulfonic acid (PFSA)-based resin is preferable.

Perfluorosulfonic Acid-Based Resin

Examples of the perfluorosulfonic acid-based resin include a polymer containing a repeating unit represented by the following general formula (3) and a repeating unit represented by the following general formula (4).

$$—[CX^1X^2—CX^3X^4]— \quad (3)$$

(In the formula (3), $X^1$, $X^2$, $X^3$, and $X^4$ each independently represent a hydrogen atom, a halogen atom or a perfluoroalkyl group having 1 to 10 carbon atoms, and at least one of $X^1$, $X^2$, $X^3$ and $X^4$ is a fluorine atom or a perfluoroalkyl group having 1 to 10 carbon atoms.)

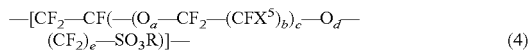

$$—[CF_2—CF(—(O_a—CF_2—(CFX^5)_b)_c—O_d—(CF_2)_e—SO_3R)]— \quad (4)$$

(In the formula (4), $X^5$ is a halogen atom or a perfluoroalkyl group having 1 to 4 carbon atoms; R is a hydrogen atom, an alkali metal atom such as a lithium atom, a sodium atom or a potassium atom, or an amine such as NH4, $NH_3R^1$, $NH_2R^1R^2$, $NHR^1R^2R^3$ or $NR^1R^2R^3R^4$ ($R^1$, $R^2$, $R^3$, and $R^4$ each independently represent an alkyl group or an aryl group having 1 to 10 carbon atoms). In addition, a is 0 or 1, b is 0 or 1, c is an integer of 0 to 8, d is 0 or 1, and e is an integer of 0 to 8. Note that b and e are not simultaneously zero.)

In a case where the perfluorosulfonic acid-based resin contains a plurality of repeating units represented by the general formula (3) and/or a plurality of repeating units represented by the general formula (4), each repeating unit may be the same or different.

The perfluorosulfonic acid-based resin is preferably a compound having one or more of the repeating units represented by the following general formulas (5) to (9).

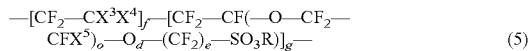

$$—[CF_2—CX^3X^4]_f—[CF_2—CF(—O—CF_2—CFX^5)_o—O_d—(CF_2)_e—SO_3R)]_g— \quad (5)$$

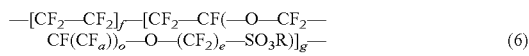

$$—[CF_2—CF_2]_f—[CF_2—CF(—O—CF_2—CF(CF_a))_o—O—(CF_2)_e—SO_3R)]_g— \quad (6)$$

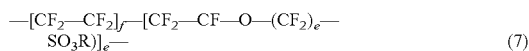

$$—[CF_2—CF_2]_f—[CF_2—CF—O—(CF_2)_e—SO_3R)]_e— \quad (7)$$

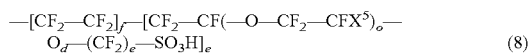

$$—[CF_2—CF_2]_f—[CF_2—CF(—O—CF_2—CFX^5)_o—O_d—(CF_2)_e—SO_3H]_e \quad (8)$$

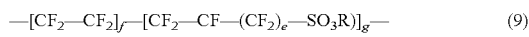

$$—[CF_2—CF_2]_f—[CF_2—CF—(CF_2)_e—SO_3R)]_g— \quad (9)$$

(In the formulas (5) to (9), $X^3$, $X^4$, $X^5$, and R are the same as in the formulas (3) and (4). In addition, c, d, and e are the same as in the formulas (3) and (4), $0 \le f < 1$, $0 < g \le 1$, and $f+g=1$. Note that e is not zero in the formula (7) or (9).)

The perfluorosulfonic acid-based resin may further contain other structural units in addition to the repeating units represented by the general formulas (3) and (4). Examples of the other structural units include the structural unit represented by the following general formula (I).

[Chemical 1]

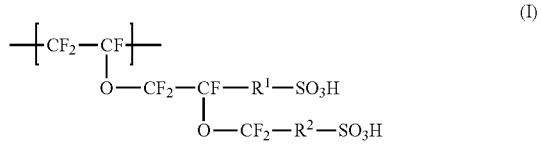

(I)

(In formula (I), $R^1$ is a single bond or a divalent perfluoro organic group having 1 to 6 carbon atoms (for example, a perfluoroalkylene group having 1 to 6 carbon atoms, or the like), and $R^2$ is a divalent perfluoro organic group having 1 to 6 carbon atoms (for example, a perfluoroalkylene group having 1 to 6 carbon atoms, or the like).)

The perfluorosulfonic acid-based resin is preferably a resin having the repeating unit represented by the formula (6) or the formula (7), and more preferably a resin consisting only of the repeating unit represented by the formula (7), from the viewpoint of obtaining a polymer electrolyte membrane that easily transmits protons and has a lower resistance.

The equivalent weight EW of the PFSA resin (the dry weight in grams of PFSA resin per equivalent of proton exchange group) is preferably adjusted to 300 to 1300. From the viewpoint of resistance, the equivalent weight EW of the PFSA resin in the present embodiment is more preferably 350 to 1000, further preferably 400 to 900, and most preferably 450 to 750.

The thickness of the electrolyte membrane 2 is preferably 5 µm or more, more preferably 10 µm or more, and further preferably 20 µm or more. In this way, it is possible to suppress a short circuit between the positive and negative electrodes, and at the same time, to suppress cross-over between the electrolytic solutions of the positive and negative electrodes. The thickness of the electrolyte membrane 2 is preferably 150 µm or less, more preferably 100 µm or less, and further preferably 75 µm or less. In this way, it is possible to reduce the battery size, and at the same time, to reduce the internal resistance.

Carbon Electrode

The carbon electrode 3 of the present embodiment is made of carbon foam. Carbon foam is a highly elastic material which is easily obtained, for example, by heating melamine resin foam in an inert gas atmosphere as described later. In addition, carbon foam has a high porosity, a large surface area, and a high electrical conductivity, so it is suitable as a battery electrode material.

<Porosity>

From the viewpoint of flexibility, the porosity of the carbon electrode (carbon foam) 3 is preferably 50% or more, more preferably 60% or more, 70% or more, 80% or more, 90% or more, or 95% or more, and further preferably 99% or more. The upper limit is not particularly limited, but it may be less than 100%, 99% or less, 98% or less, 95% or less, or 90% or less. With a porosity of 90% or more, the surface area of the electrode can be sufficiently increased and the cell resistance can be reduced when it is used as an electrode of a redox flow battery.

In the present specification, the porosity is a value obtained from bulk density and real density. Bulk density is a density based on the volume including the pores in the carbon electrode 3. On the other hand, real density is a density based on the volume occupied by the material of the carbon electrode 3.

[Measurement of Bulk Density]

First, the dimensions of the carbon electrode 3 are measured using vernier calipers or the like, and the obtained dimensions are used to determine the bulk volume $V_{bulk}$ of the carbon electrode 3. Next, the mass M of the carbon electrode 3 is measured using a precision balance. With the obtained mass M and bulk volume $V_{bulk}$, the bulk density $\rho_{bulk}$ of the carbon electrode 3 can be determined using the following equation (10).

$$\rho_{bulk}=M/V_{bulk} \quad (10)$$

[Measurement of Real Density]

The real density $\rho_{real}$ of the carbon electrode 3 can be determined with the sink-float method using a mixed solution of n-heptane, carbon tetrachloride and ethylene dibromide. Specifically, carbon foam of an appropriate size is inserted into a stoppered test tube first. Next, three solvents are appropriately mixed and added to the test tube, and the test tube is soaked in a thermostat bath at 30° C. If the specimen comes up, then low-density n-heptane is added. On the other hand, if the specimen sinks down, then high-density ethylene dibromide is added. This operation is repeated until the specimen floats in the liquid. Finally, the density of the liquid is measured using a Gay-Lussac pycnometer.

[Calculation of Porosity]

With the bulk density $\rho_{bulk}$ and real density $\sigma_{real}$ determined as described above, the porosity $V_{f,\ pore}$ can be determined using the following equation (11).

$$V_{f,\ pore} = ((1/\rho_{bulk}) - (1/\rho_{real}))/(1/\rho_{bulk}) \times 100(\%) \tag{11}$$

<Carbon Content>

From the viewpoint of conductivity, the carbon content of the carbon foam of the present embodiment is preferably 51 mass % or more, 60 mass % or more, 65 mass % or more, 70 mass % or more, 75 mass % or more, or 80 mass % or more, more preferably 85 mass % or more, and further preferably 90 mass % or more. The upper limit is not particularly limited, but it may be 100 mass % or less, 99 mass % or less, or 98 mass % or less. The carbon content of the carbon foam can be determined by X-ray fluorescence measurement, and specifically, it is measured with the method described in the EXAMPLES section.

<Coefficient of Friction>

It is important that the MMD of the carbon electrode 3 according to the KES method is 0.006 or less. MMD is one of the indicators indicating the roughness of the surface to be measured (see Sueo KAWABATA, "Standardization and Analysis of Texture Evaluation", 2nd Edition, The Textile Machinery Society of Japan, Texture Measurement and Standardization Research Committee, issued on Jul. 10, 1980). It is preferably 0.005 or less, more preferably 0.004 or less, and further preferably 0.003 or less. The lower limit is not particularly limited, but it may be more than 0.000 or 0.001 or more, and more preferably 0.002 or more.

We discovered that the MMD of the carbon electrode 3 according to the KES method is closely related to the phenomenon that the electrolyte membrane 2 peels from the carbon electrode 3 due to the repetition of electrolysis, charge and discharge, and the like. In addition, we discovered that the peeling of the electrolyte membrane 2 can be suppressed by setting the MMD of the carbon electrode 3 according to the KES method to 0.006 or less. Although the reason is not necessarily clear, we consider as follows. That is, MMD is an indicator indicating the surface roughness, and generally, a large numerical value indicates a large surface roughness. Reducing the MMD of the carbon foam, that is, reducing the surface roughness seems to contradict the general mechanism for increasing the joining strength between the electrolyte membrane 2 and the carbon electrode 3. However, we speculate that this specific behavior is based on the following mechanism derived from the structure of the carbon foam. That is, the carbon foam has a network structure in which fibrous carbon with a diameter of 1 μm to 3 μm is three-dimensionally crosslinked. It is considered that the fiber diameter of the carbon foam, which is smaller than that of a common carbon fiber paper or carbon fiber nonwoven fabric, is the main factor that leads to a small MMD of the carbon foam. On the other hand, the fact that the fiber diameter is small indicates that the specific surface area of the carbon foam is large, and it is considered that the increase in the contact area with the electrolyte membrane 2 leads to the improvement of joining strength.

As described above, when the mean deviation of the coefficient of friction of the carbon electrode 3 according to the KES method is 0.006 or less, the peeling between the electrolyte membrane 2 and the carbon electrode 3 can be suppressed without causing the carbon electrode 3 to penetrate the electrolyte membrane 2 to cause a short circuit, even in a state of being strongly sandwiched by current collectors and applied with a large compressive stress.

In the present specification, the coefficient of friction of the carbon electrode 3 is measured on a side surface or a back surface (a surface other than the surface to be joined to the electrolyte membrane 2) of the carbon electrode 3 before the formation of an membrane electrode assembly 1.

We discovered that the MMD measured at the above-mentioned position is closely related to the state of the joining interface between the electrolyte membrane 2 and the carbon electrode 3, and that the peeling of the electrolyte membrane 2 can be suppressed when the MMD at the above-mentioned position is 0.006 or less. Therefore, in the present specification, the MMD is measured on a side surface or a back surface of the carbon electrode 3 (that is, a surface other than the joining surface of the carbon electrode 3 to the electrolyte membrane 2).

[Method of Measuring Coefficient of Friction]

The measurement of the coefficient of friction of the carbon electrode 3 by the KES method can be performed using a friction tester KES-SE manufactured by KATO TECH CO., LTD. which is equipped with a 10 mm square piano-wire sensor. Specifically, the carbon electrode 3 is fixed to the stage of the tester first. Next, the sensor of the tester is pressed against the fixed carbon electrode 3 with a load of 10 gf. Subsequently, the stage on which the carbon electrode 3 is fixed moves 25 mm horizontally at a speed of 1 mm/s, and the coefficient of friction MIU is measured at regular intervals. Assuming that the number of measurements is N and the average value of MIU is $MIU_{ave}$, the mean deviation MMD of the coefficient of friction MIU can be determined using the following equation (12).

$$MMD = \Sigma |MIU - MIU_{ave}|/N \tag{12}$$

The shape of the carbon electrode 3 is not particularly limited, but it is preferably in a sheet shape from the viewpoint of easy handling and processing as an electrode.

For example, when the carbon foam constituting the carbon electrode 3 is formed by heating a melamine resin foam, it will have a structure in which the fibrous carbon constituting the framework of the carbon electrode 3 spreads uniformly in all directions. In this case, if the heating of the melamine resin foam is performed while applying a pressure in a predetermined direction, then a framework structure in which the fibrous carbon spreads anisotropically is obtained. The carbon foam constituting the carbon electrode 3 of the present embodiment may have an isotropic framework structure in which the fibrous carbon spreads isotropically, or an anisotropic framework structure in which the fibrous carbon spreads anisotropically.

A carbon foam with an isotropic framework structure is formed with no pressure applied thereon. Therefore, the formed carbon foam has a high porosity (for example, 99% or more) and is more flexible so that the carbon foam can be compressed with a small stress. As a result, it is possible to more flexibly cope with the swelling and contraction of the electrolyte membrane during electrolysis and charge and discharge of the battery. On the other hand, a carbon foam with an anisotropic framework structure is formed with a pressure applied thereon, and therefore has a lower porosity (for example, 95% or more) than that of the carbon foam with an isotropic framework structure. However, it is possible to suppress deterioration or powdering off caused by the fibrous carbon breakage, even when the carbon foam is strongly sandwiched by current collectors and applied with a large compressive stress during the formation of a cell.

<Average Diameter>

The average diameter $d_{ave}$ of the fibrous carbon constituting the carbon electrode 3, which is measured by scanning electron microscope observation, is preferably 10 µm or less, more preferably 5 µm or less, and further preferably 3 µm or less. In this way, the peeling resistance between the electrolyte membrane 2 and the carbon electrode 3 can be improved as the specific surface area increases. The lower limit of the average diameter $d_{ave}$ of the fibrous carbon is not particularly limited, but it may be 0.1 µm or more, 0.5 µm or more, or 1 µm or more.

[Method of Measuring Average Diameter]

The average diameter $d_{ave}$ of the fibrous carbon constituting the carbon electrode 3 is determined by image analysis of a scanning electron microscope image. Specifically, the carbon electrode 3 is observed at a magnification of 10,000 using a scanning electron microscope. Twenty locations are randomly selected on the obtained observation image, and the thickness of the fibrous carbon at these locations is measured. Assuming that the cross section is in a circular shape, the average thickness is taken as the average diameter $d_{ave}$.

<Specific Surface Area>

The specific surface area S of the carbon electrode 3, which is determined from the real density of the carbon electrode and the average diameter of the fibrous carbon constituting the carbon electrode, is preferably 0.5 m²/g or more and more preferably 1 m²/g or more. In this way, it is possible to sufficiently secure the joining area to the electrolyte membrane 2 and improve the peeling resistance. The upper limit of the specific surface area S is not particularly limited, but it may be 100 m²/g or less, 50 m²/g or less, 30 m²/g or less, 15 m²/g or less, or 10 m²/g or less.

[Calculation of Specific Surface Area]

Assuming that the shape of the fibrous carbon constituting the carbon electrode 3 is cylindrical, the specific surface area S of the carbon electrode 3 can be determined from the real density $\rho_{real}$ and the average diameter $d_{ave}$ determined as described above using the following equation (13).

$$S=4/(\rho_{real} \times d_{ave}) \quad (13)$$

<Compressive Stress>

The compressive stress $\sigma_{60}$ at a compressive strain of 60% of the carbon electrode 3 measured by a uniaxial compression test is preferably 400 kPa or less, more preferably 100 kPa or less, and further preferably 40 kPa or less. In this way, the carbon electrode 3 is more flexible even in a state where it is strongly sandwiched by current collectors and applied with a large compressive stress, and the peeling resistance between the electrolyte membrane 2 and the carbon electrode 3 can be improved. In addition, it is preferable 10 kPa or more, and more preferable 20 kPa or more. In this way, the membrane electrode assembly obtains good handling properties, which renders cell assembly easy.

[Method of Measuring Compressive Stress]

The compressive stress $\sigma_{60}$ at a compressive strain of 60% of the carbon electrode 3 can be determined with a stress-strain curve of uniaxial compression, which is measured using a universal material tester TG-1KN manufactured by Minebea Co., Ltd. Specifically, a specimen obtained by cutting the carbon electrode 3 into a rectangular solid of 20 mm wide and 5 mm to 20 mm high is uniaxially compressed at a speed of 5 mm/min in the height direction. The stress at a strain of 60% of the resulting stress-strain curve is taken as the compressive stress $\sigma_{60}$.

<Tinting Strength>

The tinting strength of the carbon foam of the present embodiment is preferably 5% or more, more preferably 10% or more, and further preferably 15% or more, from the viewpoint of the ease of detection of carbon foam mixed in electrolyte solution due to powdering off in a case where, for example, the carbon foam is used in a redox flow battery. The upper limit is not particularly limited, but it may be 60% or less, 50% or less, or 40% or less. The tinting strength is measured with the method described in the EXAMPLES section.

The carbon foam constituting the carbon electrode 3 can be formed, for example, by carbonizing a melamine resin foam at 800° C. to 2500° C. in an inert atmosphere. A melamine/formaldehyde condensation foam produced with the method described in JP H04-349178 A can be used as the melamine resin foam, for example.

According to the above method, an aqueous solution or dispersion containing a melamine/formaldehyde precondensate, an emulsifier, a volatile foaming agent, a curing agent, and, if necessary, a well-known filler is first subjected to foaming treatment and then curing treatment to obtain a melamine/formaldehyde condensation foam.

In the above method, the melamine/formaldehyde precondensate may be one having a ratio of melamine:formaldehyde=1:1.5 to 1:4, and an average molecular weight of 200 to 1000, for example. In addition, examples of the emulsifier include 0.5 mass % to 5 mass % (based on the melamine/formaldehyde precondensate, the same as below) of sodium salts of alkyl sulfonic acid and aryl sulfonic acid, examples of the volatile foaming agent include 1 mass % to 50 mass % of pentane and hexane, and examples of the curing agent include 0.01 mass % to 20 mass % of hydrochloric acid and sulfuric acid. In the foaming treatment and the curing treatment, the solution composed of the above components may be heated to a temperature set in accordance with the type of the used volatile foaming agent and the like.

Next, the melamine resin foam is carbonized. The carbonization can be performed in an inert gas stream or in an inert atmosphere such as in vacuum. The lower limit of the heat treatment temperature is preferably 800° C. or higher, more preferably 900° C. or higher, and further preferably 1000° C. or higher, from the viewpoint of enhancing the conductivity. On the other hand, the upper limit of the heat treatment temperature is preferably 2500° C. or lower, more preferably 2400° C. or lower, and further preferably 2200° C. or lower, from the viewpoint of maintaining the flexibility of the electrode.

The thickness of the carbon electrode 3 is preferably 20 µm or more, more preferably 100 µm or more, and further preferably 200 µm or more. In this way, it is possible to secure a sufficient electrode surface area and reduce the resistance associated with electrochemical reactions. In addition, the thickness of the carbon electrode 3 is preferably 2000 µm or less, more preferably 1000 µm or less, and further preferably 500 µm or less. In this way, it is possible to reduce the resistance associated with the movement of electrons inside the electrode, and at the same time, miniaturize the cell.

(Method of Forming Membrane Electrode Assembly)

Examples of methods of joining the electrolyte membrane 2 and the carbon electrode 3 to form a membrane electrode assembly 1 include a hot pressing method and a method of using a solution of a polymer of the same type as the membrane for joining. Among these, the hot pressing method is preferable from the viewpoint of processability. Specifically, the hot pressing method is performed as follows to form a membrane electrode assembly 1. First, an electrolyte membrane 2 is sandwiched between two carbon electrodes 3 and placed between the pressure plates of a hot press machine together with a spacer of an appropriate thickness. Next, the pressure plates are heated to a predetermined temperature to perform pressing. After keeping for a predetermined time, the pressure plates are opened, and the membrane electrode assembly 1 is taken out and cooled to room temperature. A membrane electrode assembly 1 can be formed in this way.

In the hot pressing method, the heating temperature is preferably 80° C. or higher and 200° C. or lower, and more preferably 120° C. or higher and 160° C. or lower. In this way, the softened electrolyte membrane 2 can be closely adhered and firmly joined to the carbon electrodes 3 without causing thermal deterioration of the electrolyte membrane 2. The thickness of the spacer is preferably 10% or more and 50% or less and more preferably 20% or more and 40% or less of the total thickness of the electrolyte membrane 2 and the two carbon electrodes 3. The keeping time after pressing is preferably 5 minutes or longer and 30 minutes or shorter and more preferably 10 minutes or longer and 20 minutes or shorter. In this way, the electrolyte membrane 2 and the carbon electrodes 3 can be firmly joined without causing a short circuit between the carbon electrodes.

EXAMPLES

Examples of the First Embodiment

The following provides a description of specific examples and comparative examples. However, this disclosure is not limited to the following examples.

<Preparation of Carbon Form>

Example 1

First, a melamine resin foam (dimensions: 90 mm×120 mm×40 mm) was prepared as a carbon foam material. Next, carbon fiber nonwoven fabric with a thickness of 6 mm was placed on the prepared melamine resin foam and a graphite plate was placed thereon. Then, a compressive load of 280 Pa was applied, and the melamine resin foam was introduced into a heat treatment furnace with the compressive load applied thereon. Subsequently, nitrogen gas was supplied into the furnace at a flow rate of 2.5 L/min, and the temperature in the furnace was raised to 1100° C. at a heating rate of 5° C./min. This state was kept for 1 hour to carbonize the melamine resin foam. Subsequently, the temperature in the furnace was cooled to room temperature, and the carbonized melamine resin foam was taken out from the furnace. A carbon foam of Example 1 was prepared in this way.

Example 2

A carbon foam of Example 2 was prepared as in Example 1. However, the compressive load applied to the melamine resin foam was 70 Pa. The other conditions were the same as in Example 1.

Example 3

A carbon foam of Example 3 was prepared as in Example 1. However, the compressive load applied to the melamine resin foam was 630 Pa. The other conditions were the same as in Example 1.

Example 4

A carbon foam of Example 4 was prepared as in Example 1. However, the heat treatment temperature of the melamine resin foam was 2000° C. The other conditions were the same as in Example 1.

Example 5

A carbon foam of Example 5 was prepared as in Example 2. However, the heat treatment temperature of the melamine resin foam was 2000° C. The other conditions were the same as in Example 2.

Example 6

A carbon foam of Example 6 was prepared as in Example 1. However, the compressive load applied to the melamine resin foam was 18 Pa, and the heat treatment temperature was 1500° C. The other conditions were the same as in Example 1.

Example 7

A melamine resin foam (dimensions: 90 mm×120 mm×40 mm) was prepared as a carbon foam material. Next, a sample was placed on a 250 mm square graphite plate, a SUS plate in a size of 150 mm×20 mm with a thickness of 0.5 mm was placed next to the sample as a spacer, and another graphite plate was placed thereon so that the sample and the spacer were sandwiched between the graphite plates. The sample and the spacer sandwiched between the graphite plates were introduced into a vacuum press machine (KVHC-II) manufactured by KITAGAWA SEIKI CO.,LTD, and pressed at a set pressure of 2.0 MPa while reducing the pressure with a vacuum pump. The temperature was raised to 360° C. at a heating rate of 5° C./min as the depressurization continued, and the temperature was kept at 360° C. for 10 minutes and then cooled down. After taking out the sample, the sample was also placed on a graphite plate as in Example 6, applied with a compressive load of 18 Pa, and introduced into a heat treatment furnace with the compressive load applied thereon, and a heat treatment was performed at 1500° C. A carbon foam of Example 7 was prepared in this way.

Comparative Example 1

A carbon foam was prepared as in Example 1. However, no compressive load was applied to the melamine resin foam via a graphite plate. The other conditions were the same as in Example 1.

Comparative Example 2

A carbon foam was prepared as in Example 4. However, no compressive load was applied to the melamine resin foam via a graphite plate. The other conditions were the same as in Example 4.

<SEM Observation>

Figure 1B:
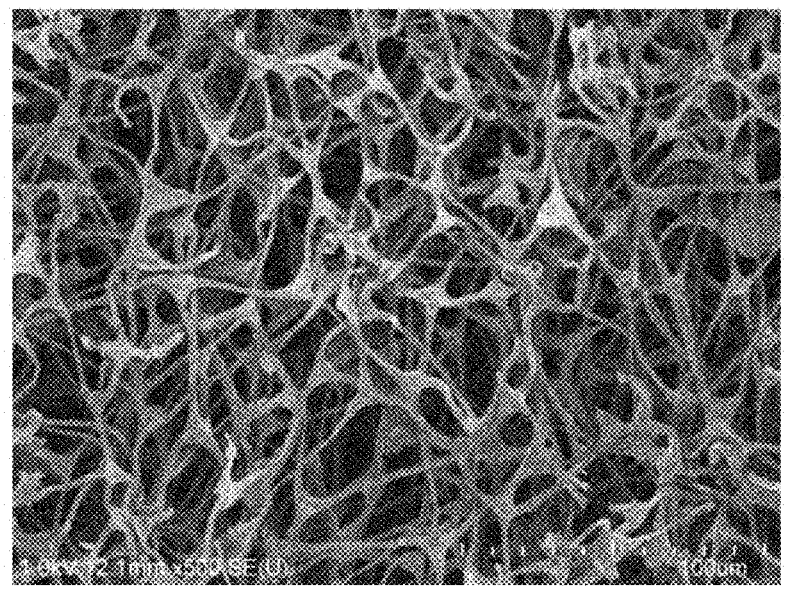
Figure 2:
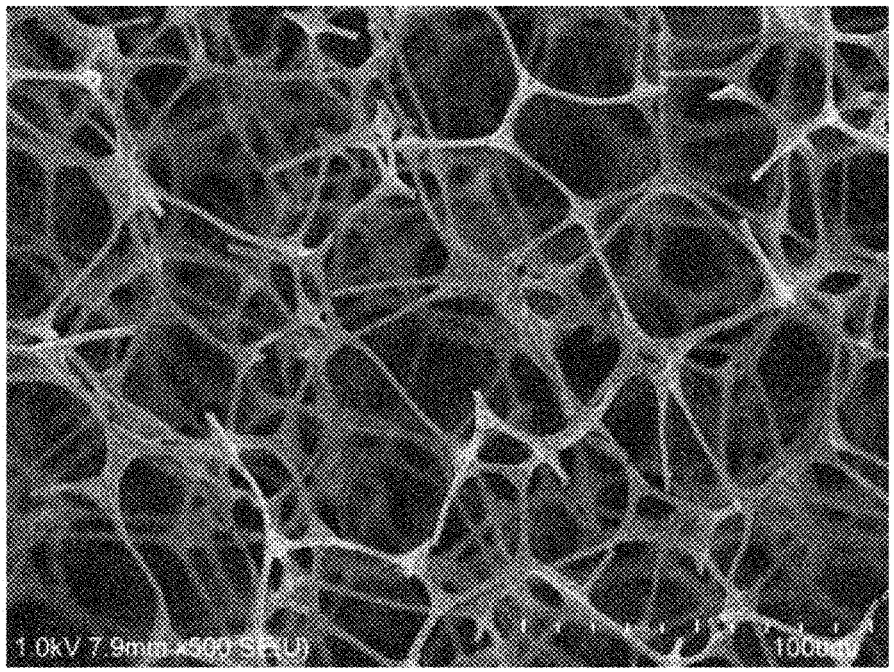
FIG. 2 is an SEM image of the surface of the carbon foam of Comparative Example 1.

FIGS. 1A and 1B are scanning electron microscope (SEM) images of the carbon foam of Example 1, and FIG. 2 is a SEM image of the carbon foam of Comparative Example 1. FIG. 1A is a cross section image of Example 1 (a cross section of the application direction of the compressive load), and FIG. 1B is a surface image of Example 1 (a surface perpendicular to the application direction of the compressive load). The magnification is 500 times for all SEM images.

As apparent from FIGS. 1A and 1B, in the carbon foam of Example 1, the linear portions of the carbon fibers are joined at the node portions, and the linear portions are oriented in the direction perpendicular to the application direction of the compressive load. On the other hand, in the carbon foam of Comparative Example 1 illustrated in FIG. 2, the linear portions of the carbon fibers are isotropically oriented.

In addition, the average diameter $d_{ave}$ of fibrous carbon and the specific surface area S of the carbon foam were measured and calculated.

<Structural Analysis by X-ray CT>

Structural analysis by X-ray CT was performed on the carbon foams of Examples 1 to 7 and Comparative Examples 1 to 2 with the thickness direction being the x-axis. Specifically, in order to facilitate X-ray imaging, electroless copper plating was first performed on each of the carbon foams of the Examples and Comparative Examples. Subsequently, a specimen (sample) was collected from each carbon foam, and structural analysis was performed on the collected specimens using a high-resolution 3D X-ray microscope nano3DX (manufactured by Rigaku Corporation). The following describes the electroless plating conditions and the X-ray CT analysis conditions in detail.

By using the median filter, the obtained three-dimensional images were processed in one pixel, and the processed images were binarized using Otsu's algorithm.

Subsequently, Centerline Editor (Ver. 7) of Simpleware software manufactured by JSOL Corporation with default setting values was used to remove lines of 2.16 μm or less as noise, and then the number $N_n$ of the node portions and the number $N_l$ of the linear portions in a measurement field of view of 300 μm×300 μm×300 μm were determined.

Furthermore, taking the thickness direction of the carbon foam as x direction (x-axis), the direction perpendicular to the x direction as y direction (y-axis), and the direction perpendicular to the x direction and the y direction as z direction (z-axis), the vector of each linear portion in the measurement field of view was calculated, and the average value $\theta_{avex}$ of the orientation angle with respect to the x-axis, the average value $\theta_{avey}$ of the orientation angle with respect to the y-axis, and the average value $\theta_{avez}$ of the orientation angle with respect to the z-axis were calculated for each vector. In this case, the orientation angle was converted so as to be within 90 degrees.

Figure 4:
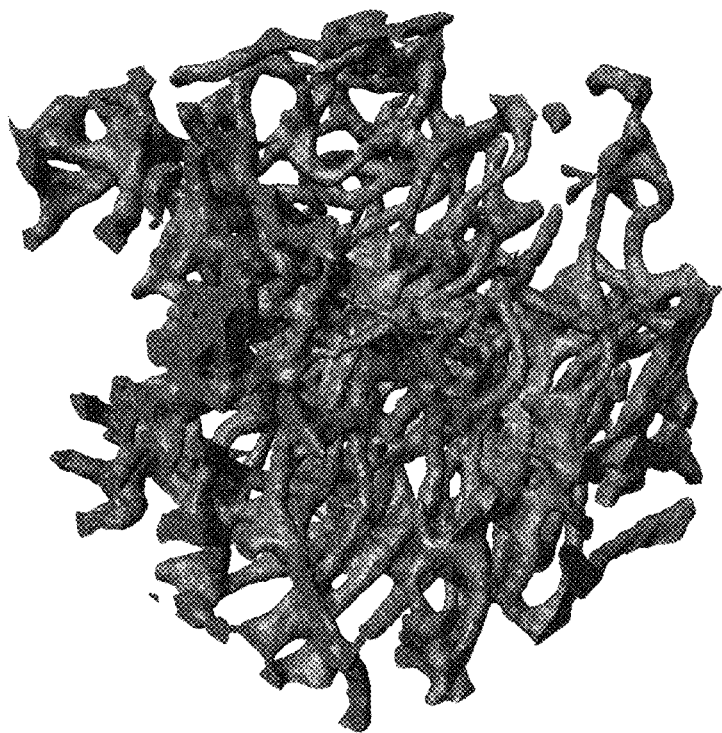
FIG. 4 is an X-ray CT analysis image obtained with the carbon foam of Comparative Example 1.
Figure 5:
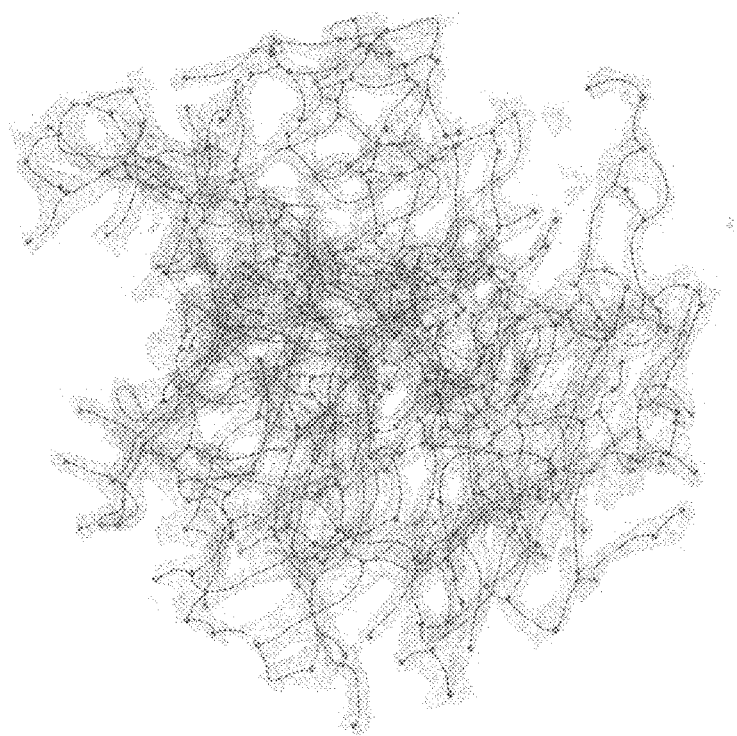
FIG. 5 is an image obtained by subjecting the image of FIG. 4 to image processing for line and node detection.
Figure 7A:
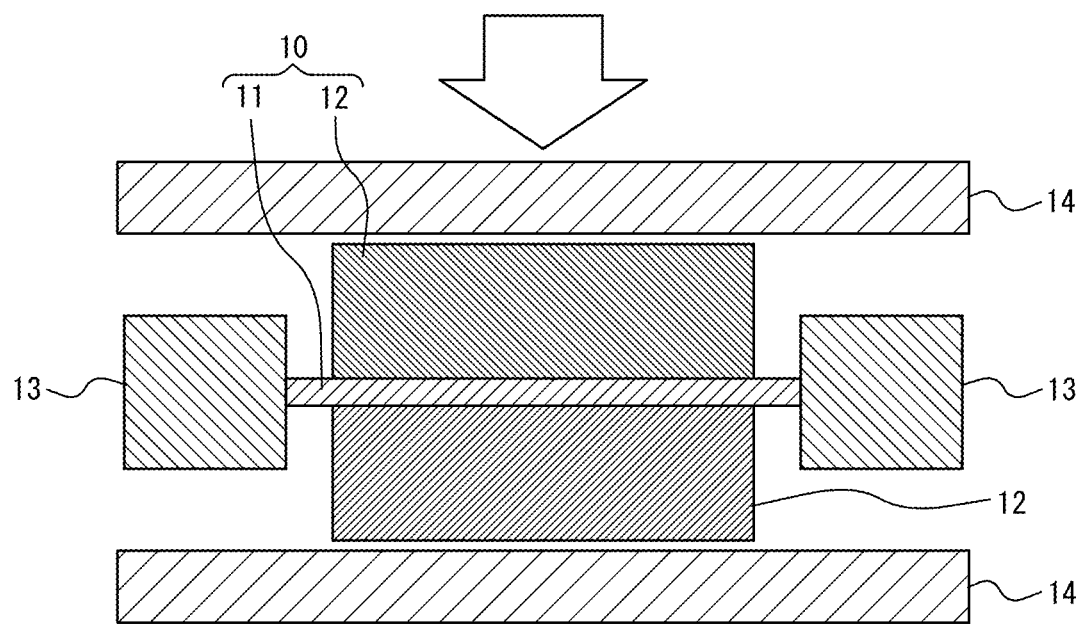
FIGS. 7A and 7B are schematic views of a common cell structure.
Figure 7B:
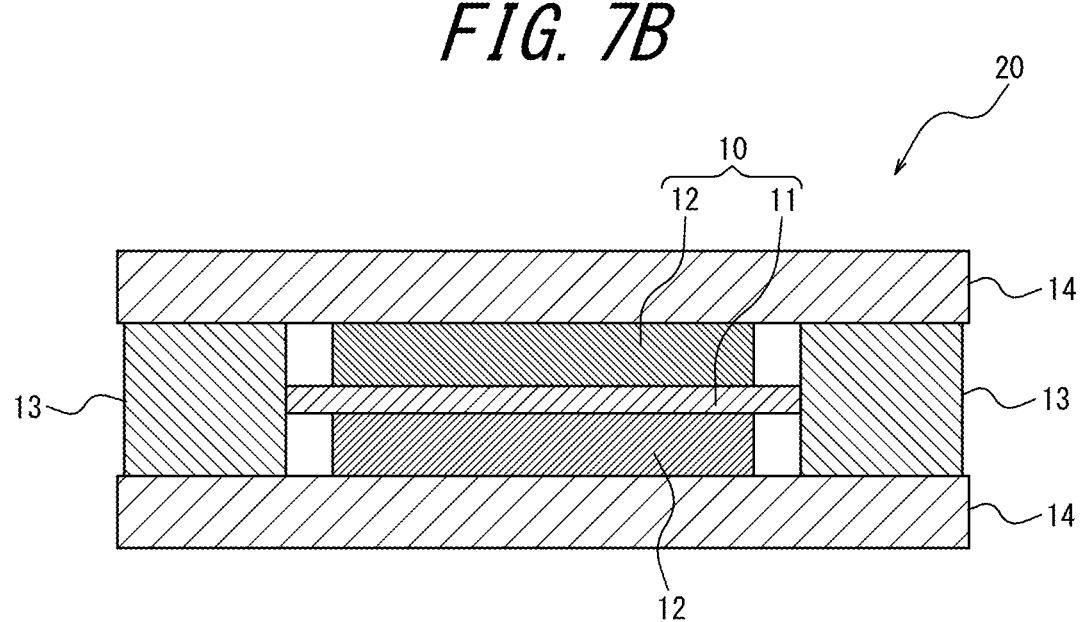

As an example of the results, FIG. 4 is an X-ray CT analysis image obtained with the carbon foam of Comparative Example 1, and FIG. 5 is an image obtained by subjecting the image of FIG. 4 to image processing for line and node detection.

[Electroless Plating Condition]

The sample was immersed in OPC Condiclean MA (manufactured by Okuno Chemical Industries Co., Ltd., diluted to 100 mL/L with distilled water) at 70° C. for 5 minutes, and then washed with distilled water for 1 minute. Subsequently, the sample was immersed in OPC Predip 49L (manufactured by Okuno Chemical Industries Co., Ltd., diluted to 10 mL/L with distilled water and added with 98% sulfuric acid at 1.5 mL/L) at 70° C. for 2 minutes, and then washed with distilled water for 1 minute. Subsequently, the sample was immersed in a solution, which was obtained by mixing OPC Inducer 50 AM (manufactured by Okuno Chemical Industries Co., Ltd., diluted to 100 mL/L with distilled water) and OPC Inducer 50 CM (manufactured by Okuno Chemical Industries Co., Ltd., diluted to 100 mL/L with distilled water) at 1:1, at 45° C. for 5 minutes, and then washed with distilled water for 1 minute. Subsequently, the sample was immersed in OPC-150 Crystal MU (manufactured by Okuno Chemical Industries Co., Ltd., diluted to 150 mL/L with distilled water) at room temperature for 5 minutes, and then washed with distilled water for 1 minute. Subsequently, the sample was immersed in OPC-BSM (manufactured by Okuno Chemical Industries Co., Ltd., diluted to 125 mL/L with distilled water) at room temperature for 5 minutes. Subsequently, the sample was immersed in a solution, which was obtained by mixing Chemical Copper 500A (manufactured by Okuno Chemical Industries Co., Ltd., diluted to 250 mL/L with distilled water) and Chemical Copper 500B (manufactured by Okuno Chemical Industries Co., Ltd., diluted to 250 mL/L with distilled water) at 1:1, at room temperature for minutes, and then washed with distilled water for 5 minutes. Subsequently, the sample was subjected to vacuum drying at 90° C. for 12 hours to dry the water.

[X-Ray Condition]

X-ray target: Cu

X-ray tube voltage: 40 kV

X-ray tube current: 30 mA

[Imaging condition]

Number of projections: 1500 sheets

Rotation angle: 180°

Exposure time: 20 seconds/sheet

Spatial resolution: 0.54 μm/pixel

With the above structural analysis, the number $N_n$ of the node portions, the number $N_l$ of the linear portions, the average values of the orientation angle with respect to the three mutually orthogonal directions (x, y, z), and the density of the node portions were determined. The results are listed in Table 1. In Table 1, $\theta_c$ is the difference between the maximum value and the minimum value of $\theta_{avex}$, $\theta_{avey}$ and $\theta_{avez}$, and $\theta_d$ is a smaller value of the difference between $\theta_{avex}$ and $\theta_{avey}$ or $\theta_{avez}$.

<Carbon Content>

The carbon content of carbon foams of Examples 1 to 7 and Comparative Examples 1 to 2 was measured. The sample was cut into a 35 mm square and set in a sample holder for an X-ray irradiation diameter of 30 mmφ. Subsequently, measurement was performed using an X-ray fluorescence analyzer ZSX-100E (wavelength dispersion type, Rh tubular lamp) manufactured by Rigaku Corporation. Semi-quantitative analysis was performed on all elements in the X-ray irradiation diameter of 30 mmφ to determine the carbon content in all elements. The measurement results are listed in Table 1.

<Tinting Strength>

The tinting strength of the carbon foams was measured in the same manner as JIS K6217-5 which is a method of measuring the tinting strength of carbon black.

First, 0.1 g of standard carbon black for tinting strength measurement, 3.75 g of standard zinc oxide, and 2 mL of epoxidized soybean oil (specific gravity: 0.92 to 0.99) were kneaded using a planetary ball mill. The kneading conditions were as follows: number of balls: 10; rotational speed: 200 rpm; and time: 10 minutes. The obtained paste was spread on a glass plate using an applicator. The reflectance of the film-like paste was measured using a blackness meter manufactured by Tokyo Denshoku Co., Ltd. The reflectance of pastes, which were obtained by varying the mass of the standard carbon black to be added in a range of 0.01 g to 0.14 g, was measured in the same manner, and a calibration curve indicating the relationship between the reflectance and the standard tinting strength value was obtained. The standard tinting strength value is a value of standard carbon black mass (g)×1000(%).

Next, the reflectance of a paste obtained by kneading 0.1 g of carbon foam and 2 mL of epoxidized soybean oil was measured in the same manner, and the tinting strength was determined using the calibration curve. The measurements results are listed in Table 1.

which a compressive load is applied is smaller than that of the carbon foams of Comparative Examples 1 to 2.

<Evaluation of Crystallite Size>

The crystallite size Lc of the carbon foams of Examples 1 to 7 and Comparative Examples 1 to 2 was evaluated by the diffraction of the (002) plane. The sample was ground in a mortar. Subsequently, the ground sample was subjected to wide-angle X-ray measurement using a desktop X-ray diffractometer D2 PHASER (manufactured by Bruker Corporation). The specific measurement conditions were as follows.

[Measurement Condition]
Radiation source: Cu Kα
Tube current: 30 mA
Tube voltage: 40 kV

TABLE 1

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Ratio R ($N_f/N_n$) | 1.45 | 1.48 | 1.45 | 1.46 | 1.46 | 1.45 | 1.5 | 1.45 | 1.44 |
| Average value of orientation angle in x direction (°) | 62 | 65.4 | 65.8 | 62.2 | 60.5 | 59 | 66.5 | 58 | 58.1 |
| Average value of orientation angle in y direction (°) | 55.3 | 60.8 | 55.4 | 56 | 56.7 | 55.7 | 50.5 | 57.7 | 57.7 |
| Average value of orientation angle in z direction (°) | 56.3 | 46.7 | 52.1 | 55.5 | 55.3 | 55.9 | 54.5 | 57.8 | 57.6 |
| $\theta_c$ (°) | 6.7 | 18.7 | 13.7 | 6.7 | 5.2 | 3.3 | 16 | 0.3 | 0.5 |
| $\theta_d$ (°) | 5.7 | 4.6 | 10.4 | 6 | 3.8 | 3.1 | 12 | 0.2 | 0.4 |
| Node portion density (number $N_n$ of node portions/mm³) | 557778 | 71539 | 676889 | 563012 | 62375 | 30000 | 2000000 | 19363 | 19784 |
| Specific surface area (S/cm²) | 1.2 | 1.2 | 1.2 | 1.1 | 1.1 | 1.1 | 1.1 | 1.2 | 1.1 |
| Carbon content (wt %) | 91.5 | 91.8 | 91.6 | 99.9 | 99.9 | 98.2 | 98.2 | 89.3 | 99.9 |
| Average diameter $d_{ave}$ of fibrous carbon (μm) | 2 | 2 | 2 | 2 | 2 | 2 | 2 | 2 | 2 |
| Tinting strength (%) | 23 | 23 | 22 | 28 | 29 | 25 | 26 | 23 | 24 |

FIG. 3 plots the results of the Examples and Comparative Examples. It is apparent from FIG. 3 that the weight of powdering off increases sharply when $\theta_c$ is less than 3°, and the weight of powdering off increases sharply when $\theta_d$ is less than 3°.

<Evaluation of Powdering off Weight (Evaluation of Compressive Load Resistance)>

The compressive load resistance of the carbon foams of Examples 1 to 7 and Comparative Examples 1 to 2 was evaluated. Specifically, the carbon foams of the Examples and Comparative Examples were each cut into a sample of 20 mm square, the sample was sandwiched by flat plates through which four bolts with a nominal diameter of 0.6 mm penetrated, and the bolts were each fastened at 0.3 N·m using a torque wrench to apply a compressive load of 1.25 MPa to the sample. After keeping this state for 1 minute, the load was removed, and in order to remove the powder remaining inside the structure, the sample was handled with wafer tweezers and lightly knocked on a drug packing paper to remove the powder inside. In this case, the application direction of the compressive load to the carbon foams of Examples 1 to 7 was the same as the direction in which the load was applied during the preparation of the carbon foams. The treatment was repeated, and then the powdered carbon fibers were recovered to measure their mass. The results are listed in Table 2.

As apparent from Table 2, the mass of the powdered carbon fibers in the carbon foams of Examples 1 to 7 to Slit: 1 mm
Sample rotational speed: 10 rotations/minute
Measurement time of one step: 0.3 seconds
Start angle (2θ): 5.00°
Measurement step (2θ): 0.01°
End angle (2θ): 90.00°

After the measurement, the obtained data were analyzed to calculate the crystallite size Lc. The crystallite size Lc can be determined by substituting the half-value width β of the diffraction peak of the (002) plane appearing near 2θ=25 degrees and the angle θ of the peak maximum value into the following Scherrer equation (14). In general, a higher carbonization temperature leads to higher crystallinity and a larger Lc value.

$$Lc=(K\lambda)/\beta \cos \theta \quad (14)$$

where K represents the form factor, and λ represents the wavelength of the radiation source. Because the form factor is (002) plane diffraction, 0.90 is substituted. Because CuKα is used as the radiation source in this case, 1.541 is substituted for calculation. The results are listed in Table 2.

When the heat treatment is performed at a high temperature of 2000° C., the crystallinity is higher and the Lc is larger than that of the case of 1100° C.

<Evaluation of Resilience by Uniaxial Compression Test>

The carbon foams of Examples 1 to 7 and Comparative Examples 1 to 2 were compressed uniaxially, and then their resilience was measured. The sample was cut into a 20 mm square, and then compressed to 40% of the initial membrane thickness using a tensile and compression tester TG-1 kN (manufactured by Minebea Co., Ltd.). Subsequently, the load was removed and the sample was allowed to stand for 60 seconds, and the membrane thickness after recovery was measured. The specific measurement conditions were as follows.

[Measurement Condition]
Load cell: TU3D-1 kN, maximum load 1000 N
Compression speed: 10 mm/min It can be seen from Table 2 that there is an apparent difference in resilience between Examples 4 to 5 and Comparative Example 2 where the heat treatment was performed at 2000° C. In particular, Examples 4 to 5 exhibit an equivalent resilience to that of Examples 1 to 3 and Comparative Example 1 where the heat treatment was performed at 1100° C. It can be understood from this fact that the anisotropic carbon foam structure of the present disclosure can maintain conventional resilience while providing high crystallinity even when the heat treatment is performed at high temperatures.

<Evaluation of Redox Flow Battery Resistance>

Redox flow batteries were prepared using the carbon foams prepared in Examples 1 to 7 and Comparative Examples 1 to 2 as electrodes, and the redox flow batteries were subjected to charge and discharge tests to evaluate the cell resistance. In order to improve the hydrophilicity, the carbon foams to be used as electrodes were subjected to heat treatment using dry air as a pretreatment. The heat treatment was performed by charging the carbon foams into a furnace, supplying dry air at a flow rate of 1 L/min using an air cylinder, raising the temperature in the furnace to 500° C. at a heating rate of 5° C./min and keeping this state for 1 hour.

The electrolytic solution on the positive electrode side was 50 mL of a sulfuric acid aqueous solution containing tetravalent vanadium ($V^{4+}$), and the electrolytic solution on the negative electrode side was 50 mL of a sulfuric acid aqueous solution containing trivalent vanadium ($V^{3+}$). Both solutions were adjusted so that the vanadium ion concentration was 1.5 M/L and the total sulfate ion concentration was 3.5 M/L. Nafion® 212 (manufactured by DuPont, USA) was used as a diaphragm for separating the positive electrode and the negative electrode. A carbon foam electrode was placed on each of the positive and negative sides of the diaphragm and a current collector (for the positive and negative electrodes) was placed on the outside, and these parts were fastened with bolts to assemble a cell. The fastening torque was adjusted to 4 N·m using a torque wrench. A PTFE spacer was placed between the diaphragm and the current collector so that the thickness of the carbon foam after cell assembly would be 70% of the original thickness.

Other charge and discharge test conditions were as follows.

Electrode area: 10 $cm^2$
Current density: 70 $mA/cm^2$

The cell resistance was determined by dividing the average value of overvoltage during charge and discharge by the current density. The results are listed in Table 2.

<Evaluation of Breakage Resistance Of Electrode>

The breakage resistance of the electrodes of Examples 1 to 7 and Comparative Examples 1 to 2 was evaluated using a stack cell obtained by stacking three cells with an electrode area of 100 $cm^2$.

Nafion® 212 (manufactured by DuPont, USA) was used as a diaphragm for separating the positive electrode and the negative electrode. A carbon foam electrode was placed on each of the positive and negative sides of the diaphragm and a current collector (for the positive and negative electrodes) was placed on the outside, and these parts were fastened with bolts to assemble a cell. The fastening torque was adjusted to 4 N·m using a torque wrench. A PTFE spacer was placed between the diaphragm and the current collector so that the thickness of the carbon foam after cell assembly would be 70% of the original thickness. Distilled water was passed for 1 hour instead of an electrolytic solution, and it was confirmed that there was no leak or pressure increase. Subsequently, the cell was disassembled, and the deformation of the electrodes was evaluated based on the following standards.

Excellent: no breakage was found in any electrode, and it was able to remove the electrodes from the cell.

Good: when disassembling the cell, no breakage was found in any electrode; however, when removing the electrodes from the cell, breakage occurred in some electrodes.

Poor: when disassembling the cell, breakage was found in all electrodes.

TABLE 2

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Weight of powdered carbon fiber (wt %) | 1.1 | 1.0 | 1.0 | 3.9 | 3.8 | 9 | 2.8 | 62.6 | 80.2 |
| Crystallite size (nm) | 1.2 | 1.18 | 1.17 | 2.02 | 1.98 | 1.38 | 1.4 | 1.18 | 2.01 |
| Resilience (%, with the thickness before compression being 100 %) | 92 | 90 | 88 | 91 | 90 | Excellent | Excellent | 91 | 70 |
| Resistance evaluation (ohm cm2) | 0.55 | 0.82 | 0.61 | 0.57 | 0.88 | 1.08 | 0.78 | 1.26 | 1.26 |
| Breaking resistance of electrode | Excellent | Excellent | Excellent | Excellent | Excellent | Good | Excellent | Poor | Poor |

Examples of the Second Embodiment

The following provides a description of specific examples and comparative examples. However, this disclosure is not limited to the following examples.

Example 8

<Preparation of Membrane Electrode Assembly>
[Preparation of Carbon Form]

First, a melamine resin foam (dimensions: 90 mm×90 mm×10 mm) was prepared. The melamine resin foam was placed on a graphite plate and introduced into a heat treatment furnace. Next, nitrogen gas was circulated at a flow rate of 1 L/min after ventilating the inside of the furnace with nitrogen gas. Subsequently, the temperature was raised to 800° C. at a heating rate of 5° C./min, and the foam was subjected to heat treatment for 1 hour. Then, the foam was cooled to room temperature and taken out, and a carbon foam was prepared. The dimensions of the obtained carbon foam were 45 mm×45 mm×5 mm.

In addition, the bulk density, real density, porosity, mean deviation MMD of coefficient of friction, average diameter $d_{ave}$ of fibrous carbon, specific surface area S and compressive stress $\sigma_{60}$ at a compressive strain of 60% of the carbon foam were measured respectively. The results are listed in Table 3.

[Joining of Electrolyte Membrane and Carbon Foam]

Nafion® (manufactured by DuPont, USA) having dimensions of 50 mm×50 mm×0.05 mm was prepared as an electrolyte membrane. The electrolyte membrane was sandwiched by the carbon foam prepared as described above, and the electrolyte membrane and the carbon foam were joined with hot pressing method. Specifically, the electrolyte membrane was sandwiched between two sheets of carbon foam and placed between the pressure plates of a hot press machine together with a spacer of 2 mm thickness. Next, the pressure plates were heated to 160° C. to perform pressing. After keeping for 10 minutes, the pressure plates were opened, and a membrane electrode assembly was taken out and cooled to room temperature. A membrane electrode assembly of Example 8 was prepared in this way.

Example 9

A membrane electrode assembly of Example 9 was prepared as in Example 8. However, the heat treatment temperature of the melamine resin foam was 1100° C. The other conditions were the same as in Example 8.

Example 10

A membrane electrode assembly of Example 10 was prepared as in Example 8. However, the heat treatment temperature of the melamine resin foam was 1500° C. The other conditions were the same as in Example 8.

Example 11

A membrane electrode assembly of Example 11 was prepared as in Example 9. However, the heat treatment of the melamine resin foam was performed with a compressive stress of 70 Pa applied on the melamine resin foam. In addition, the thickness of the spacer used for hot pressing was 0.4 mm. The other conditions were the same as in Example 9.

Example 12

A membrane electrode assembly of Example 12 was prepared as in Example 9. However, the heat treatment of the melamine resin foam was performed with a compressive stress of 280 Pa applied on the melamine resin foam. In addition, the thickness of the spacer used for hot pressing was 0.2 mm. The other conditions were the same as in Example 9.

Comparative Example 3

A membrane electrode assembly of Comparative Example 3 was prepared using a carbon fiber nonwoven fabric (SIGRACELL GFA6EA manufactured by SGL CARBON) as a carbon electrode instead of using the carbon foam in Example 8. In this case, the thickness of the spacer used for hot pressing was 2 mm. The other conditions were the same as in Example 8.

TABLE 3

| | Example 8 | Example 9 | Example 10 | Example 11 | Example 12 | Comparative Example 3 |
|---|---|---|---|---|---|---|
| Ratio R ($N_f/N_n$) | 1.45 | 1.45 | 1.45 | 1.45 | 1.46 | 1.29 |
| Bulk density $\rho_{bulk}$ (g cm$^{-3}$) | 0.008 | 0.008 | 0.008 | 0.051 | 0.085 | 0.095 |
| Real density $\rho_{real}$ (g cm$^{-3}$) | 1.6 | 1.7 | 1.8 | 1.7 | 1.7 | 1.9 |
| Porosity $V_{f,pore}$ (%) | >99 | >99 | >99 | 97 | 95 | 95 |
| Mean deviation MMD of coefficient of friction | 0.003 | 0.006 | 0.006 | 0.005 | 0.005 | 0.007 |
| Average diameter $d_{ave}$ of fibrous carbon (μm) | 2 | 2 | 2 | 2 | 2 | 9 |
| Specific surface area S (m$^2$g$^{-1}$) | 1.3 | 1.2 | 1.1 | 1.2 | 1.2 | 0.2 |
| Compressive stress σ60 at 60% compressive strain (kPa) | 23 | 31 | 16 | 105 | 400 | 142 |
| Peeling resistance test result (curving) | Excellent | Excellent | Excellent | Good | Good | Poor |
| Peeling resistance test result (ethylene glycol immersion) | Good | Good | Good | Good | Good | Poor |
| Carbon content (wt %) | 52.6 | 89.3 | 98.2 | 91.8 | 91.5 | 99 |
| Average diameter $d_{ave}$ of fibrous carbon (μm) | 2 | 2 | 2 | 2 | 2 | 9 |
| Tinting strength (%) | 20 | 23 | 25 | 23 | 23 | 20 |

<Structural Analysis by X-ray CT>

Structural analysis by X-ray CT was performed on the carbon foams of Examples 8 to 12 and the carbon fiber nonwoven fabric of Comparative Example 3.

The structural analysis by X-ray CT was performed with the thickness direction being the x-axis. Specifically, in order to facilitate X-ray imaging, electroless copper plating was first performed on each of the carbon foams of the Examples and Comparative Examples. Subsequently, a specimen (sample) was collected from each carbon foam, and structural analysis was performed on the collected specimens using a high-resolution 3D X-ray microscope nano3DX (manufactured by Rigaku Corporation). The following describes the electroless plating conditions and the X-ray CT analysis conditions in detail.

By using the median filter, the obtained three-dimensional images were processed in one pixel, and the processed images were binarized using Otsu's algorithm.

Subsequently, Centerline Editor (Ver. 7) of Simpleware software manufactured by JSOL Corporation with default setting values was used to remove lines of 2.16 μm or less as noise, and then the number $N_n$ of the node portions and the number $N_1$ of the linear portions in a measurement field of view of 300 μm×300 μm×300 μm were determined.

[Electroless Plating Condition]

The sample was immersed in OPC Condiclean MA (manufactured by Okuno Chemical Industries Co., Ltd., diluted to 100 mL/L with distilled water) at 70° C. for 5 minutes, and then washed with distilled water for 1 minute. Subsequently, the sample was immersed in OPC Predip 49L (manufactured by Okuno Chemical Industries Co., Ltd., diluted to 10 mL/L with distilled water and added with 98% sulfuric acid at 1.5 mL/L) at 70° C. for 2 minutes, and then washed with distilled water for 1 minute. Subsequently, the sample was immersed in a solution, which was obtained by mixing OPC Inducer 50 AM (manufactured by Okuno Chemical Industries Co., Ltd., diluted to 100 mL/L with distilled water) and OPC Inducer 50 CM (manufactured by Okuno Chemical Industries Co., Ltd., diluted to 100 mL/L with distilled water) at 1:1, at 45° C. for 5 minutes, and then washed with distilled water for 1 minute. Subsequently, the sample was immersed in OPC-150 Crystal MU (manufactured by Okuno Chemical Industries Co., Ltd., diluted to 150 mL/L with distilled water) at room temperature for 5 minutes, and then washed with distilled water for 1 minute. Subsequently, the sample was immersed in OPC-BSM (manufactured by Okuno Chemical Industries Co., Ltd., diluted to 125 mL/L with distilled water) at room temperature for 5 minutes. Subsequently, the sample was immersed in a solution, which was obtained by mixing Chemical Copper 500A (manufactured by Okuno Chemical Industries Co., Ltd., diluted to 250 mL/L with distilled water) and Chemical Copper 500B (manufactured by Okuno Chemical Industries Co., Ltd., diluted to 250 mL/L with distilled water) at 1:1, at room temperature for minutes, and then washed with distilled water for 5 minutes. Subsequently, the sample was subjected to vacuum drying at 90° C. for 12 hours to dry the water.

[X-ray Condition]
X-ray target: Cu
X-ray tube voltage: 40 kV
X-ray tube current: 30 mA
[Imaging condition]
Number of projections: 1500 sheets
Rotation angle: 180°
Exposure time: 20 seconds/sheet
Spatial resolution: 0.54 μm/pixel With the above structural analysis, the number $N_n$ of the node portions, the number $N_1$ of the linear portions, and the density of the node portions were determined. The results are listed in Table 3.

<Carbon Content>

The carbon content of carbon foams of Examples 8 to 12 and Comparative Example 3 was measured. The sample was cut into a 35 mm square and set in a sample holder for an X-ray irradiation diameter of 30 mmϕ. Subsequently, measurement was performed using an X-ray fluorescence analyzer ZSX-100E (wavelength dispersion type, Rh tubular lamp) manufactured by Rigaku Corporation. Semi-quantitative analysis was performed on all elements in the X-ray irradiation diameter of 30 mmϕ to determine the carbon content in all elements. The measurement results are listed in Table 1.

<Tinting Strength>

The tinting strength of the carbon foams was measured in the same manner as JIS K6217-5 which is a method of measuring the tinting strength of carbon black.

First, 0.1 g of standard carbon black for tinting strength measurement, 3.75 g of standard zinc oxide, and 2 mL of epoxidized soybean oil (specific gravity: 0.92 to 0.99) were kneaded using a planetary ball mill. The kneading conditions were as follows: number of balls: 10; rotational speed: 200 rpm; and time: 10 minutes. The obtained paste was spread on a glass plate using an applicator. The reflectance of the film-like paste was measured using a blackness meter manufactured by Tokyo Denshoku Co., Ltd. The reflectance of pastes, which were obtained by varying the mass of the standard carbon black to be added in a range of 0.01 g to 0.14 g, was measured in the same manner, and a calibration curve indicating the relationship between the reflectance and the standard tinting strength value was obtained. The standard tinting strength value is a value of standard carbon black mass (g)×1000(%).

Next, the reflectance of a paste obtained by kneading 0.1 g of carbon foam and 2 mL of epoxidized soybean oil was measured in the same manner, and the tinting strength was determined using the calibration curve. The measurements results are listed in Table 1.

<Evaluation of Peeling Resistance>

The peeling resistance of the membrane electrode assemblies of Examples 8 to 12 and Comparative Example 3 was evaluated. Specifically, the evaluation was performed in terms of the presence or absence of peeling when the membrane electrode assembly was curved, and in terms of the peeling when the membrane electrode assembly was immersed in ethylene glycol. Each evaluation will be described below.

[Evaluation by Curving]

Evaluation was performed on each of the membrane electrode assemblies of Examples 8 to 12 and Comparative Example 3 in terms of the presence or absence of peeling between the electrolyte membrane and the carbon foam when the assembly was curved. Specifically, the membrane electrode assembly was curved along the side surface of a round bar of 20 mm diameter so that the membrane electrode assembly curved at a radius of curvature of 20 mm, and it was evaluated by visual observation whether or not peeling occurred between the electrolyte membrane and the carbon foam. The same evaluation was also performed in a case where the membrane electrode assembly was curved at a radius of curvature of 10 mm. The evaluation results are listed in Table 3.

In Table 3, "Excellent" indicates that peeling did not occur in both cases where the radius of curvature was 20 mm and 10 mm; "Good" indicates that peeling did not occur in the case where the radius of curvature was 20 mm, but occurred in the case where the radius of curvature was 10 mm; and "Poor" indicates that peeling occurred in both cases where the radius of curvature was 20 mm and 10 mm.

[Evaluation by Ethylene Glycol Immersion]

Evaluation was performed on each of the membrane electrode assemblies of Examples 8 to 12 and Comparative Example 3 in terms of the presence or absence of peeling between the electrolyte membrane and the carbon foam when the assembly was immersed in ethylene glycol. Specifically, ethylene glycol was supplied into a container, and the membrane electrode assembly was immersed in the ethylene glycol while keeping the temperature of the ethylene glycol at 25° C. After 12 hours, it was evaluated by visual observation whether or not peeling occurred between the electrolyte membrane and the carbon foam. The evaluation results are listed in Table 3.

In Table 3, "Good" indicates that peeling did not occur; "Fair" indicates that peeling occurred partially after 12 hours; and "Poor" indicates that it completely peeled off after 12 hours.

As apparent from Table 3, for the membrane electrode assemblies of Examples 8 to 12, peeling occurred neither in the peeling evaluation by curving the membrane electrode assembly at a radius of curvature of 20 mm nor in the peeling evaluation by ethylene glycol immersion. In particular, for Examples 8 to 10 in which the compressive stress $\sigma_{60}$ was 40 MPa or less, peeling did not occur even in the peeling evaluation by curving the membrane electrode assembly at a radius of curvature of 10 mm. On the other hand, for Comparative Example 3, peeling occurred in both of the peeling evaluation by curving and the peeling evaluation by ethylene glycol immersion.

INDUSTRIAL APPLICABILITY

According to the present disclosure, it is possible to provide a carbon foam in which carbon fiber breakage is suppressed and powdering off is reduced when a compressive load is applied thereon, and a membrane electrode assembly in which the peeling of electrolyte membrane from electrode caused by the repetition of electrolysis, charge and discharge, and the like is suppressed and the decrease in performance is suppressed. The present disclosure is useful in battery industry and power generation industry

REFERENCE SIGNS LIST 1, 10 membrane electrode assembly
2, 11, 111 electrolyte membrane
3 carbon electrode
12, 112 electrode
13 separator
14 current collector
20 cell
100 redox flow battery
101 electrolytic bath
102, 103 tank
104, 105 pump
106 power source
112a positive electrode
112b negative electrode

The invention claimed is:

1. A carbon foam comprising linear portions and node portions joining the linear portions, wherein
the carbon foam has a carbon content of 51 mass % or more,
when the carbon foam is applied with a compressive load of 1.25 MPa and left standing for one minute, powdering off is 10 mass % or less, and
the linear portions have an anisotropic orientation.

2. The carbon foam according claim 1, having a tinting strength of 5% or more and 60% or less.

3. The carbon foam according to claim 1, wherein a ratio of the number of the linear portions to the number of the node portions is 1.2 or more and 1.7 or less.

4. The carbon foam according to claim 3, wherein the ratio of the number of the linear portions to the number of the node portions is 1.4 or more and 1.5 or less.

5. The carbon foam according to claim 1, wherein an average diameter of fibrous carbon of the linear portions is 5 μm or less.

6. The carbon foam according to claim 1, wherein a crystallite size determined from diffraction of (002) plane in powder X-ray diffraction measurement is 1.50 nm or more.

7. The carbon foam according to claim 1, wherein the carbon foam recovers to 80% or more of an initial membrane thickness within 60 seconds after release from a load which compresses the carbon foam to 40% of the initial membrane thickness in a uniaxial compression test.

8. The carbon foam according to claim 1, wherein a mean deviation of coefficient of friction by the Kawabata evaluation system method is 0.006 or less.

9. The carbon foam according to claim 1, wherein a specific surface area determined from a real density of the carbon foam and the average diameter of fibrous carbon of the linear portions is 0.5 m$^2$/g or more.

10. A membrane electrode assembly comprising an electrolyte membrane and the carbon electrode made of the carbon foam according to claim 1 on one side or both sides of the electrolyte membrane.

11. A carbon foam comprising linear portions and node portions joining the linear portions, wherein
the carbon foam has a carbon content of 51 mass % or more,
at least a part of the carbon foam has a density of the node portions of 30,000/mm$^3$ or more, and
the linear portions have an anisotropic orientation.

12. The carbon foam according to claim 11, having a tinting strength of 5% or more and 60% or less.

13. The carbon foam according to claim 11, wherein a ratio of the number of the linear portions to the number of the node portions is 1.2 or more and 1.7 or less.

14. The carbon foam according to claim 13, wherein the ratio of the number of the linear portions to the number of the node portions is 1.4 or more and 1.5 or less.

15. The carbon foam according to claim 11, wherein an average diameter of fibrous carbon of the linear portions is 5 μm or less.

16. The carbon foam according to claim 11, wherein a crystallite size determined from diffraction of (002) plane in powder X-ray diffraction measurement is 1.50 nm or more.

17. The carbon foam according to claim 11, wherein the carbon foam recovers to 80% or more of an initial membrane thickness within 60 seconds after release from a load which compresses the carbon foam to 40% of the initial membrane thickness in a uniaxial compression test.

18. The carbon foam according to claim 11, wherein a mean deviation of coefficient of friction by the Kawabata evaluation system method is 0.006 or less.

19. The carbon foam according to claim 11, wherein a specific surface area determined from a real density of the carbon foam and the average diameter of fibrous carbon of the linear portions is 0.5 m$^2$/g or more.

20. A membrane electrode assembly comprising an electrolyte membrane and the carbon electrode made of the carbon foam according to claim 11 on one side or both sides of the electrolyte membrane.

21. A carbon foam comprising linear portions and node portions joining the linear portions, wherein
the linear portions have an anisotropic orientation,
in at least a part of the carbon foam, a thickness direction of the carbon foam is defined as x direction, a direction perpendicular to the x direction is defined as y direction, and a direction perpendicular to the x direction and the y direction is defined as z direction, and
for the linear portions in a region of 300 μm×300 μm×300 μm, an average value of orientation angle with respect to the x direction is defined as $\theta_{avex}$, an average value of orientation angle with respect to the y direction is defined as $\theta_{avey}$, and an average value of orientation angle with respect to the z direction is defined as $\theta_{avez}$, then a difference $\theta_c$ between the maximum value and the minimum value of the $\theta_{avex}$, the $\theta_{avey}$ and the $\theta_{avez}$ is 3° or more.

22. The carbon foam according to claim 21, having a tinting strength of 5% or more and 60% or less.

23. The carbon foam according to claim 21, wherein a ratio of the number of the linear portions to the number of the node portions is 1.2 or more and 1.7 or less.

24. The carbon foam according to claim 23, wherein the ratio of the number of the linear portions to the number of the node portions is 1.4 or more and 1.5 or less.

25. The carbon foam according to claim 21, wherein an average diameter of fibrous carbon of the linear portions is 5 µm or less.

26. The carbon foam according to claim 21, wherein a crystallite size determined from diffraction of (002) plane in powder X-ray diffraction measurement is 1.50 nm or more.

27. The carbon foam according to claim 21, wherein the carbon foam recovers to 80% or more of an initial membrane thickness within 60 seconds after release from a load which compresses the carbon foam to 40% of the initial membrane thickness in a uniaxial compression test.

28. The carbon foam according to claim 21, wherein a mean deviation of coefficient of friction by the Kawabata evaluation system method is 0.006 or less.

29. The carbon foam according to claim 21, wherein a specific surface area determined from a real density of the carbon foam and the average diameter of fibrous carbon of the linear portions is 0.5 m$^2$/g or more.

30. A membrane electrode assembly comprising an electrolyte membrane and the carbon electrode made of the carbon foam according to claim 21 on one side or both sides of the electrolyte membrane.

* * * * *